United States Patent
Daemen et al.

(10) Patent No.: US 10,776,728 B1
(45) Date of Patent: Sep. 15, 2020

(54) METHODS, SYSTEMS AND APPARATUS FOR CALIBRATING DATA USING RELAXED BENCHMARK CONSTRAINTS

(71) Applicant: The Nielsen Company (US), LLC, New York, NY (US)

(72) Inventors: Ludo Daemen, Duffel (BE); Robert C. Smith, New York, NY (US); Edmond Wong, New York, NY (US); Alexander Radev, New York, NY (US); Vippal Savani, Oxfordshire (GB); Christophe Koell, Brussels (BE); William Somers, New York, NY (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 761 days.

(21) Appl. No.: 15/583,337

(22) Filed: May 1, 2017

Related U.S. Application Data

(60) Provisional application No. 62/379,517, filed on Aug. 25, 2016, provisional application No. 62/379,205, (Continued)

(51) Int. Cl.
*G06Q 10/06* (2012.01)
*G06F 17/16* (2006.01)

(52) U.S. Cl.
CPC ....... *G06Q 10/06313* (2013.01); *G06F 17/16* (2013.01)

(58) Field of Classification Search
CPC ........... G06F 19/00; G06F 1/00–40/00; G06Q 00/00–99/00
(Continued)

(56) References Cited

U.S. PATENT DOCUMENTS 7,287,000 B2 * 10/2007 Boyd ................. G06Q 30/0244
705/14.43
7,512,542 B1    3/2009 Kriss et al.
(Continued)

FOREIGN PATENT DOCUMENTS

GB          2354387 A  *  3/2001  ........... G01S 5/0252

OTHER PUBLICATIONS

Buyya, Rajkumar & Murshed, M. & Abramson, David & Venugopal, Srikumar. (2005). Scheduling parameter sweep applications on global Grids: A deadline and budget constrained cost-time optimization algorithm. Softw., Pract. Exper.. 35. 491-512. 10.1002/spe. 646. (Year: 2005).*
(Continued)

*Primary Examiner* — Alan S Miller
*Assistant Examiner* — Jay-Ming Wang
(74) *Attorney, Agent, or Firm* — Hanley, Flight & Zimmerman, LLC

(57) ABSTRACT

Methods, systems and apparatus for calibrating data using relaxed benchmarks constraints are described. An example apparatus for generating a unique solution when calibrating data via a calibration model having relaxed benchmark constraints includes a calibration engine to execute the calibration model based on a target loss function, a weight loss function, and a budget parameter. The example apparatus further includes a calibrated weights determiner to determine calibrated weights resulting from execution of the calibration model. The example apparatus further includes a calibration model validator to incorporate a stability parameter into the calibration model in response to determining that the calibrated weights do not provide a unique solution for the executed calibration model. The stability parameter is to reduce an influence of the budget parameter on the
(Continued)

calibration model to enable the generation of a unique solution.

21 Claims, 7 Drawing Sheets

Related U.S. Application Data filed on Aug. 24, 2016, provisional application No. 62/378,041, filed on Aug. 22, 2016, provisional application No. 62/346,897, filed on Jun. 7, 2016.

(58) Field of Classification Search
USPC .............................................. 705/7.11–7.42
See application file for complete search history.

(56) References Cited

U.S. PATENT DOCUMENTS

| | | | |
|---|---|---|---|
| 7,580,852 | B2 | 8/2009 | Ouimet et al. |
| 7,873,529 | B2 | 1/2011 | Kruger et al. |
| 8,797,668 | B1 | 8/2014 | Grinchuk et al. |
| 9,306,600 | B2 | 4/2016 | Varanasi et al. |
| 2003/0083756 | A1* | 5/2003 | Hsiung .............. G05B 19/4093 700/28 |
| 2005/0197954 | A1 | 9/2005 | Maitland et al. |
| 2006/0085325 | A1 | 4/2006 | Jammal et al. |
| 2006/0168613 | A1 | 7/2006 | Wood et al. |
| 2008/0133291 | A1 | 6/2008 | Nasser et al. |
| 2008/0140480 | A1 | 6/2008 | Kruger et al. |
| 2008/0288889 | A1 | 11/2008 | Hunt et al. |
| 2008/0294996 | A1 | 11/2008 | Hunt et al. |
| 2009/0006156 | A1 | 1/2009 | Hunt et al. |
| 2009/0319829 | A1 | 12/2009 | Takayama |
| 2014/0089051 | A1 | 3/2014 | Piotrowski et al. |
| 2014/0278294 | A1* | 9/2014 | Yeager .................... G06F 30/20 703/2 |
| 2015/0262201 | A1 | 9/2015 | Rao et al. |

OTHER PUBLICATIONS

Wikipedia, "Binomial Theorem," retrieved from Wikipedia on Nov. 8, 2012, 11 pages.

Wikipedia, "Negative Binomial Distribution," retrieved from Wikipedia on Nov. 8, 2012, 10 page.

United States Patent and Trademark Office, "Final Office Action," issued in connection with U.S. Appl. No. 13/837,746, dated Apr. 14, 2017, 23 pages.

United States Patent and Trademark Office, "Final Office Action," issued in connection with U.S. Appl. No. 13/837,746, dated May 6, 2016, 20 pages.

United States Patent and Trademark Office, "Non-Final Office Action," issued in connection with U.S. Appl. No. 13/837,746, dated Sep. 9, 2016, 39 pages.

United States Patent and Trademark Office, "Non-Final Office Action," issued in connection with U.S. Appl. No. 13/837,746, dated Sep. 25, 2015, 51 pages.

Arlot et al., "Data-driven Calibration of Penalties for Least-Squares Regression", Journal of Machine Learning Research, 2009 (35 pages).

\* cited by examiner ns of example machine readable instructions that may be executed at the example calibration apparatus of FIG. 1 to determine model parameter data for the soft calibration model to be executed by the calibration apparatus.

METHODS, SYSTEMS AND APPARATUS FOR CALIBRATING DATA USING RELAXED BENCHMARK CONSTRAINTS

RELATED APPLICATIONS

This patent arises from is a non-provisional application claiming priority to U.S. Provisional Application Ser. No. 62/346,897, filed Jun. 7, 2016, U.S. Provisional Application Ser. No. 62/378,041, filed Aug. 22, 2016, U.S. Provisional Application Ser. No. 62/379,205, filed Aug. 24, 2016, and U.S. Provisional Application Ser. No. 62/379,517, filed Aug. 25, 2016. U.S. Provisional Application Ser. No. 62/346,897, U.S. Provisional Application Ser. No. 62/378,041, U.S. Provisional Application Ser. No. 62/379,205, and U.S. Provisional Application Ser. No. 62/379,517 are hereby incorporated herein by reference in their entireties.

FIELD OF THE DISCLOSURE

This disclosure relates generally to methods, systems and apparatus for calibrating data and, more specifically, to methods, systems and apparatus for calibrating data using relaxed benchmark constraints.

BACKGROUND

Traditional models and/or techniques for calibrating data adjust and/or modify projection weights for the purpose of improving upon the accuracy of estimates that may be yielded from applying the projection weights to panelist and/or reporting data (e.g., survey data). The goal of such traditional calibration models and/or techniques is to adjust and/or modify the projection weights such that the weighted totals and/or results of the panelist and/or reporting data closely match known totals and/or results of reference and/or benchmark data (e.g., census data).

Traditional calibration models and/or techniques are executed and/or performed in a "hard" manner, whereby the projection weights are adjusted and/or modified such that the estimated totals of the panelist and/or reporting data match exactly with the known totals of the reference and/or benchmark data. Such traditional models and/or techniques for calibrating data are accordingly referred to herein as "hard calibration" models and/or techniques.

Figure 1:
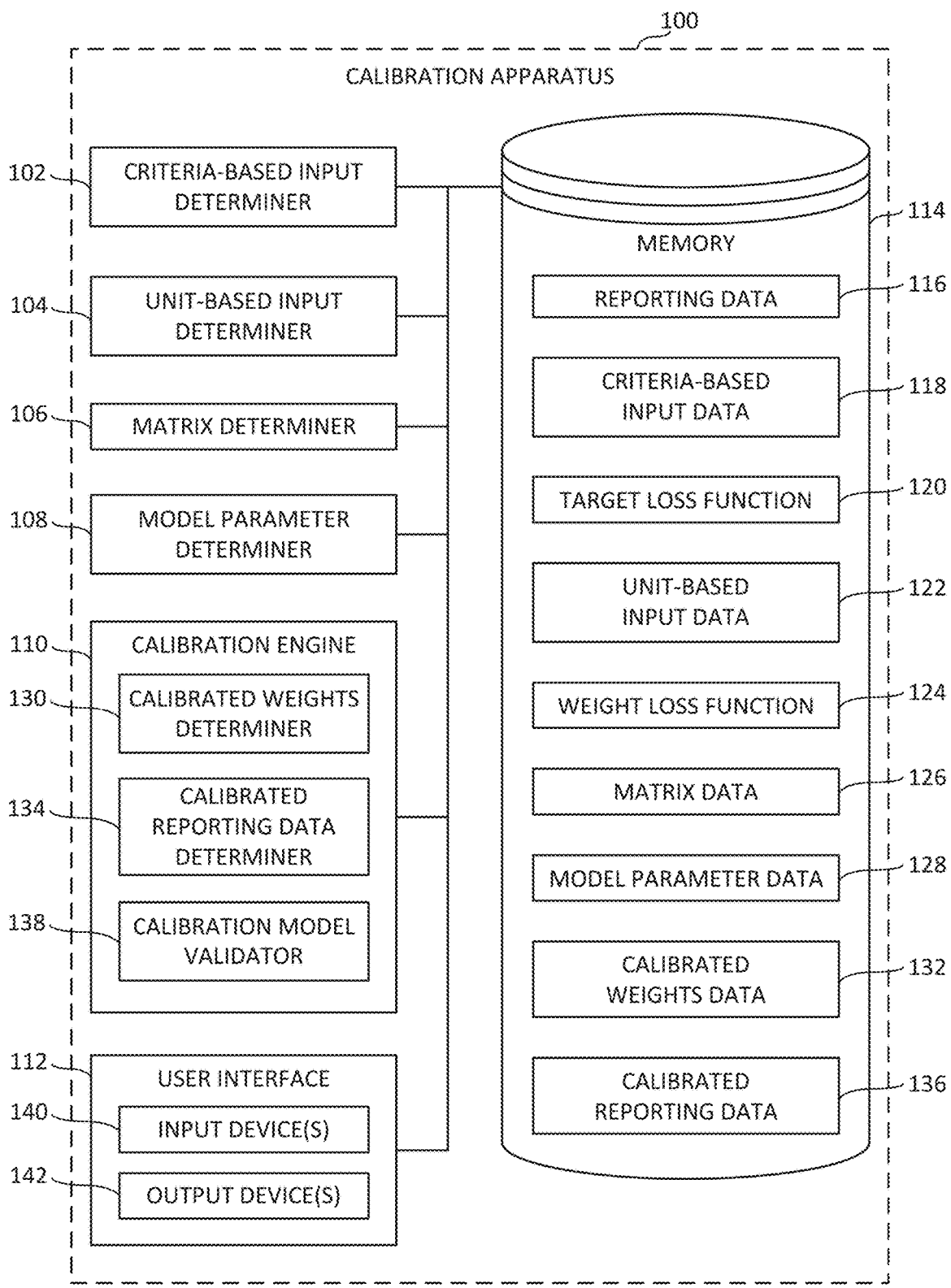
FIG. 1 is a block diagram of an example calibration apparatus constructed in accordance with the teachings of this disclosure.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

DETAILED DESCRIPTION

Clients of data measurement companies expect that panelist and/or reporting data (e.g., data obtained from tightly controlled participants having a particular demographic representation) should reasonably match reference and/or benchmark data (e.g., raw data acquired from the market, such as actual sales dollars from retail stores that may be obtained from scanner data at checkout). In the event that a data measurement company's panelist and/or reporting data is substantially different from the reference and/or benchmark data, the data measurement company's clients may question the accuracy and/or validity of the data measurement company's ability to accurately project sales and/or usage numbers using the panelist and/or reporting data.

Data measurement companies often calibrate panelist and/or reporting data to reference and/or benchmark data utilizing the traditional hard calibration models and/or techniques described above. At least one drawback of such hard calibration models and/or techniques is that the calibration weights may begin to take on a relatively large magnitude. While some demographic groups of panelist and/or reporting data might align well with the reference and/or benchmark data when such large-magnitude calibration weights are applied, these same calibration weights may result in substantial errors for other demographic groups.

In contrast to the traditional hard calibration models and/or techniques described above, the methods, systems and apparatus for calibrating data disclosed herein use relaxed benchmark constraints. As used herein, the term "soft calibration" refers to a convex optimized calibration model and/or technique providing a unique solution for calibrating a set of weights (e.g., projection weights) relative to a set of relaxed benchmark constraints. The benchmark constraints that may be implemented in the disclosed soft calibration models and/or techniques are relaxed (e.g., loosened, broadened, and/or made less rigid) relative to the benchmark constraints that might otherwise be implemented in traditional hard calibration models and/or techniques. For example, the disclosed soft calibration models and/or techniques relax the exact matching requirement of the traditional hard calibration process.

Unlike hard calibration models and/or techniques requiring that estimated totals associated with projection weights match reference and/or benchmark totals precisely, the disclosed soft calibration models and/or techniques advantageously generate adjusted and/or modified projection weights such that the distance and/or deviation between the estimated totals and the reference and/or benchmark totals is smaller than some particular value (e.g., a threshold and/or budget). By relaxing the benchmark constraints associated with traditional hard calibration models and/or techniques, the disclosed soft calibration models and/or techniques advantageously reduce (e.g., eliminate) the above-described errors that may arise in connection with the use of hard calibration models and/or techniques when the calibration weights take on a relatively large magnitude. Thus, a data measurement company implementing the disclosed soft calibration models and/or techniques in lieu of traditional hard calibration models and/or techniques may advantageously provide and/or generate calibrated panelist and/or reporting data that more closely matches and/or resembles reference and/or benchmark data.

In some examples, the apparatus, systems and methods disclosed herein for calibrating data using relaxed benchmark constraints determine a set of calibrated weights (e.g., calibrated projection weights to be applied to panelist and/or reporting data) based in part on criteria-based input data to be incorporated into a soft calibration model. In some examples, the criteria-based input data provides inputs for a target loss function of the soft calibration model.

In some examples, the criteria-based input data may include criteria associated with panelist and/or reporting data, criteria variables for the criteria, targets for the criteria variables, lower bounds for the criteria variables, upper bounds for the criteria variables, scaling parameters for the criteria variables, and/or importance parameters for the criteria variables. As used herein, the terms "criterion" and/or "criteria" refer to one or more panelist and/or reporting data point(s) to be taken into account when executing and/or performing a calibration model and/or technique. In some examples, the criteria may be identified by a unique set of names and/or characters. In other examples, the criteria may be identified by a unique set of numbers. An example indexed set of criteria (M) may be expressed and/or defined as follows:

$$M = \{k \in \mathbb{N}_{>0} : k <= m\} \qquad \text{Equation 1}$$

where k represents a dummy variable, $\mathbb{N}_{>0}$ represents the set of strictly positive natural numbers (e.g., excluding 0), and m represents the number of criteria.

In some examples, a set of criteria variables represents panelist and/or reporting values for each criterion. An example set of criteria variables (y) may be expressed and/or defined in scalar and vector notation as follows:

$$y_j \in \mathbb{R} \; \forall j \in M$$

$$\text{or: } y \in \mathbb{R}^m \qquad \text{Equation 2}$$

where $\mathbb{R}$ represents real numbers.

In the setting of soft calibration, the criteria variables are not identified and/or made to be equal to any specific prescribed value. Instead, the criteria variables are identified and/or made to be as close as possible to a set of ideal values (e.g., reference and/or benchmark data values). As used herein, the terms "target" and/or "criteria target" refer to an ideal value associated with a criteria variable. Targets for the criteria variables are to be provided as input parameters to the soft calibration model. An example set of targets (t) may be expressed and/or defined as follows:

$$t_j \in \mathbb{R}_{>0} \forall j \in M \text{ or: } t \in \mathbb{R}_{>0}^m \qquad \text{Equation 3}$$

In some examples, an upper bound and a lower bound may additionally be associated with each criteria variable. The upper bound may be a non-negative number that is greater than or equal to the corresponding target. The lower bound may be a non-negative number that is smaller than or equal to the corresponding target. Setting both the upper and lower bounds equal to the corresponding target causes the soft calibration model and/or technique to mimic a traditional hard calibration model and/or technique. Conversely, setting the lower bound to zero (0) and the upper bound to a large multiple of the target may result in the lower and upper bounds being practically inactive.

In some examples, the upper and lower bounds associated with respective ones of the criteria variables and/or targets are identified independently. Thus, some criteria variables may be required to match their corresponding targets exactly, while others criteria variables may have very loose bounds relative to their corresponding targets. Upper and lower bounds for a set of criteria variables are to be supplied as input parameters to the soft calibration model. An example set of constraints corresponding to upper bounds (u) and lower bounds (l) to be associated with a set of criteria variables (v) and/or targets (t) may be expressed and/or defined as follows:

$$l_j^y \leq y_j \leq u_j^y : l_j^y, u_j^y \in \mathbb{R}_{\geq 0}, l_j^y \leq t_j, t_j \leq u_j^y \forall j \in M$$

$$\text{or: } l^y \leq y \leq u^y : l^y, u^y \in \mathbb{R}_{\geq 0}^m, l^y \leq t, t \leq u^y \qquad \text{Equation 4}$$

In some examples, respective ones of the targets to be associated with corresponding ones of the criteria variables may have different measurement scales and/or units. For example, demographic targets measured in terms of a number of people in a group may be mixed together with purchased amount targets measured in terms of a local currency. To enable computation of a reasonable target loss, these different scales and/or units of measurement may be converted to measureless comparable quantities. In some examples, such a conversion may be based on relative distances (e.g., $((y_i - t_i)/t_i)$) between respective ones of the targets and corresponding ones of the criteria variables. In other examples, a scaling parameter (c) may be applied to respective ones of the criteria variables. Each scaling parameter (c) may be based on a relative standard error (rse) associated with the target (t) corresponding to the respective criteria variable (e.g. $c_i = rse_i t_i$). In examples described herein, the scaling parameters have positive values. Example scaling parameters (c) per criteria variable for computing target loss may be expressed and/or defined as follows:

$$c_j \in \mathbb{R}_{>0} \forall j \in M \text{ or: } c \in \mathbb{R}_{>0}^m \qquad \text{Equation 5}$$

In some examples, an importance parameter (v) may be applied to respective ones of the scaled criteria variables. The importance parameters may capture and/or represent preferences associated with respective ones of the scaled criteria variables. In some examples, each importance parameter (v) may be based on a monotonically increasing concave function of the corresponding target (t) (e.g., $v_i := \sqrt[4]{t_i}$). In examples described herein, the importance parameters have positive values. Example importance parameters (v) per criteria variable for computing target loss may be expressed and/or defined as follows:

$$v_j \in \mathbb{R}_{>0} \forall j \in M \text{ or: } v \in \mathbb{R}_{>0}^m \qquad \text{Equation 6}$$

In some examples, the criteria-based input data (e.g., criteria associated with panelist and/or reporting data, criteria variables, targets for the criteria variables, lower bounds for the criteria variables, upper bounds for the criteria variables, scaling parameters for the criteria variables, and importance parameters for the criteria variables) may be provided by, accessed from, and/or stored in a tab-separated values (TSV) file having multiple columns.

For example, a first column of a TSV file for the criteria-based input data may include identifiers (e.g., a set of unique names and/or characters) for each criterion. A second column of the TSV file for the criteria-based input data may include values (e.g., double precision numerical values) for each target. A third column of the TSV file for the criteria-based input data may include values (e.g., double precision numerical values) for each lower bound. A fourth column of the TSV file for the criteria-based input data may include values (e.g., double precision numerical values) for each upper bound. A fifth column of the TSV file for the criteria-based input data may include values (e.g., double precision numerical values) for each scaling parameter. A sixth column of the TSV file for the criteria-based input data may include values (e.g., double precision numerical values) for each importance parameter. In such an example, the respective values of the second column of the TSV file are greater than or equal to corresponding ones of the respective values of the third column of the TSV file, and less than or equal to corresponding ones of the respective values of the fourth column of the TSV file. In some such examples, the respective values of the fifth column and the sixth column of the TSV file are positive, and cannot be zero (0).

In other examples, the criteria-based input data may be provided by, accessed from, and/or stored in a file having a format that differs from that of a TSV file. For example, the criteria-based input data may be provided by, accessed from, and/or stored in a comma-separated values (CSV) file, or some other type of data file.

In response to identifying and/or determining the criteria-based input data (e.g., criteria associated with panelist and/or reporting data, criteria variables, targets for the criteria variables, lower bounds for the criteria variables, upper bounds for the criteria variables, scaling parameters for the criteria variables, and importance parameters for the criteria variables), distances between respective ones of the panelist and/or reporting values captured by the criteria variables (y), and corresponding respective ones of the targets (t), may be measured and/or determined. As used herein, the term "target loss" refers to a measured distance between (a) a panelist and/or reporting value captured by a criteria variable, and (b) a corresponding target. In some examples, target loss may be expressed and/or defined in terms of a target loss function (F(y)). In some examples, it is desired that the target loss function (F(y)) will express a weighted average of criteria variable distances while at the same time being robust with respect to outliers. Thus, it may be desired that the target loss function (F(y)) is both convex and robust.

In some examples, the target loss function (F(y)) may be based on a known Huber loss function ($H_\phi(\cdot)$). For example, the target loss function (F(y)) may be expressed and/or defined as follows:

$$F: \mathbb{R}_{\geq 0}^m \to \mathbb{R}_{\geq 0} \cup \{\infty\} \quad \text{Equation 7}$$

$$F(y) = \begin{cases} \mathcal{F}(y) & \text{for } 1^y \leq y \leq u^y, \\ \infty, & \text{otherwise.} \end{cases}$$

$$(y_j)_{j \in M} \xrightarrow{\mathcal{F}} \frac{1}{\sum_{j \in M} v_j} \sum_{j \in M} v_j H_\phi\left(\frac{y_j - t_j}{c_j}\right)$$

$$y \xrightarrow{\mathcal{F}} \frac{\langle v, H_\phi(\text{diag}(c)^{-1}(y-t))\rangle}{\langle v, 1_m \rangle}$$

where $H_\phi(\cdot)$ is the Huber loss function expressed and/or defined as follows:

$$H_\phi(z) = \begin{cases} \frac{1}{2} z^2 & \text{for } |z| \leq \phi, \\ \phi\left(|z| - \frac{1}{2}\phi\right), & \text{otherwise.} \end{cases}$$

Replacing the scalar (z) of the Huber loss function with a vector (z) results in ($H_\phi(z)$) being applied for each component of (z) with the same value of the parameter φ. In such an example, ($H_\phi(z)$) is of the same dimensionality as (z).

In some examples, the apparatus, systems and methods disclosed herein for calibrating data using relaxed benchmark constraints determine a set of calibrated weights (e.g., calibrated projection weights to be applied to panelist and/or reporting data) based in part on unit-based input data to be incorporated into the soft calibration model. In some examples the unit-based input data provides inputs for a weight loss function of the soft calibration model.

In some examples, the unit-based input data may include units associated with panelist and/or reporting data, unit variables for the units, initial weights for the unit variables, lower bounds for the unit variables, upper bounds for the unit variables, and/or size parameters for the unit variables. As used herein, the term "unit" refers to one or more projection weight(s) to be used and/or calibrated to attain one or more corresponding panelist and/or reporting data point(s) relative to one or more corresponding target(s) when executing and/or performing a calibration model and/or technique. In some examples, the units may be identified by a unique set of names and/or characters. In other examples, the units may be identified by a unique set of numbers. An example indexed set of units (N) may be expressed and/or defined as follows:

$$N = \{k \in \mathbb{N}_{>0} : k <= n\} \quad \text{Equation 8}$$

where k represents a dummy variable, $\mathbb{N}_0$ represents the set of strictly positive natural numbers (e.g., excluding 0), and n represents the number of units.

In some examples, a set of unit variables represents the calibrated weight for each unit. An example set of unit variables (x) may be expressed and/or defined in scalar and vector notation as follows:

$$x_i \in \mathbb{R} \; \forall i \in N$$

$$\text{or: } x \in \mathbb{R}^n \quad \text{Equation 9}$$

where $\mathbb{R}$ represents real numbers.

Unlike the above-described criteria variables that are made to be as close as possible to the above-described targets, there is no corresponding set of ideal values (e.g., reference and/or benchmark data values) for respective ones of the unit variables. Instead, respective ones of the unit variables are associated with corresponding respective ones of initial weights that are to be adjusted as little as possible. In some examples, respective ones of the initial weights may assume different roles in different domains (e.g., coverage adjustment, weights derived by panel design, etc.). Initial weights for the unit variables are to be supplied as input parameters to the soft calibration model. An example set of initial weights ($x^0$) may be expressed and/or defined as follows:

$$x_i^0 \in \mathbb{R}_{>0} \forall i \in N \text{ or: } x^0 \in \mathbb{R}_{>0}^n \quad \text{Equation 10}$$

In some examples, an upper bound and a lower bound may additionally be associated with each unit variable. The upper bound may be a non-negative number that is greater than or equal to the corresponding initial weight. The lower bound may be a non-negative number that is smaller than or equal to the corresponding initial weight. In some examples, the lower bound may be set to zero (0) and the upper bound may be set to a large multiple of the initial weight. In other examples, the lower bound and the upper bound may respectively be determined by dividing (for the lower bound) and/or multiplying (for the upper bound) the initial weight by a constant.

In some examples, the upper and lower bounds associated with respective ones of the unit variables and/or initial weights are identified independently. Upper and lower bounds for the unit variables are to be supplied as input parameters to the soft calibration model. An example set of constraints corresponding to upper bounds (u) and lower bounds (l) to be associated with a set of unit variables (x) and/or initial weights ($x^0$) may be expressed and/or defined as follows:

$$l_i^x \leq x_i \leq u_i^x : l_i^x, u_i^x \in \mathbb{R}_{\geq 0}, l_i^x \leq x_i^0 \leq u_i^x \forall i \in N$$

$$\text{or: } l^x \leq x \leq u^x : l^x, u^x \in \mathbb{R}_{\geq 0}^n, l^x \leq x^0 \leq u^x \quad \text{Equation 11}$$

Unlike respective ones of the targets to be associated with corresponding ones of the criteria variables described above, respective ones of the initial weights associated with corresponding respective ones of the unit variables do not have different measurement scales and/or units. Accordingly, there is no need to convert differing scales and/or units of measurement to measureless comparable quantities in connection with computing weight loss.

In some examples, a size parameter (s) may be applied to respective ones of the unit variables. The size parameters may capture and/or represent preferences associated with respective ones of the unit variables. In some examples, each size parameter (s) may be based on an average of non-zero contributions of a unit to the criteria. In examples described herein, the size parameters have positive values. Example size parameters (s) per unit variable for computing weight loss may be expressed and/or defined as follows:

$$s_i \in \mathbb{R}_{>0} \forall i \in N \text{ or: } s \in \mathbb{R}_{>0}^n \quad \text{Equation 12}$$

In some examples, the unit-based input data (e.g., units associated with panelist and/or reporting data, unit variables for the units, initial weights for unit variables, lower bounds for unit variables, upper bounds for unit variables, and size parameters for unit variables) may be provided by, accessed from, and/or stored in a TSV file having multiple columns. For example, a first column of a TSV file for the unit-based input data may include identifiers (e.g., a set of unique names and/or characters) for each unit. A second column of the TSV file for the unit-based input data may include values (e.g., double precision numerical values) for each initial weight. A third column of the TSV file for the unit-based input data may include values (e.g., double precision numerical values) for each lower bound. A fourth column of the TSV file for the unit-based input data may include values (e.g., double precision numerical values) for each upper bound. A fifth column of the TSV file for the unit-based input data may include values (e.g., double precision numerical values) for each size parameter. In such an example, the respective values of the second column of the TSV file are greater than or equal to corresponding ones of the respective values of the third column of the TSV file, and less than or equal to corresponding ones of the respective values of the fourth column of the TSV file. In some such examples, the respective values of the fifth column of the TSV file are positive, and cannot be zero (0).

In other examples, the unit-based input data may be provided by, accessed from, and/or stored in a file having a format that differs from that of a TSV file. For example, the unit-based input data may be provided by, accessed from, and/or stored in a CSV file, or some other type of data file.

In response to identifying and/or determining the unit-based input data (e.g., units associated with panelist and/or reporting data, unit variables for the units, initial weights for unit variables, lower bounds for unit variables, upper bounds for unit variables, and size parameters for unit variables), distances between respective ones of the currently evaluated weights captured by the unit variables (x), and corresponding respective ones of the initial weights ($x^0$), may be measured and/or determined. As used herein, the term "weight loss" refers to a measured distance between (a) an evaluated weight captured by a unit variable, and (b) a corresponding initial weight. In some examples, weight loss may be expressed and/or defined in terms of a weight loss function (G(x)). In some examples, it is desired that the weight loss function (G(x)) express a weighted average of unit variable distances. For example, the weight loss function (G(x)) may be expressed and/or defined as follows:

$$G : \mathbb{R}_{\geq 0}^n \to \mathbb{R}_{\geq 0} \cup \{\infty\} \quad \text{Equation 13}$$

$$G(x) = \begin{cases} g(x) & \text{for } 1^x \leq x \leq u^x, \\ \infty, & \text{otherwise.} \end{cases}$$

$$(x_i)_{i \in N} \stackrel{g}{\mapsto} \frac{1}{\sum_{i \in N} s_i x_i^0} \sum_{i \in N} s_i x_i^0 \left(\frac{x_i}{x_i^0} - 1\right)^2$$

$$x \stackrel{g}{\mapsto} \frac{\langle \text{diag}(x^0)s, (\text{diag}(x^0)^{-1} x - 1_n)^2 \rangle}{\langle x^0, s \rangle}$$

In some examples, the apparatus, systems and methods disclosed herein for calibrating data using relaxed benchmark constraints determine a set of calibrated weights (e.g., calibrated projection weights to be applied to panelist and/or reporting data) based in part on matrix data to be incorporated into the soft calibration model. In some examples, a design matrix including the matrix data may be generated and/or derived from the criteria-based input data and the unit-based input data. The design matrix may capture and/or generate relationships between the above-described units and the above-described criteria. For example, the non-expanded contribution of each unit to each criterion may be captured by a design matrix having non-negative entries. An example design matrix may be expressed and/or defined as follows:

$$(a_{ij})_{i \in N, j \in M}, a_{ij} \in \mathbb{R}_{>0} \forall i \in N \forall j \in M$$

$$A \in \mathbb{R}_{\geq 0}^{n \times m} \quad \text{Equation 14}$$

Accordingly, an example relationship formula for relationships between units and criteria may be expressed and/or defined as follows:

$$\text{Relationship} \sum_{i \in N} a_{ij} x_i = y_j \forall j \in M \quad \text{Equation 15}$$

Matrix Notation $Ax = y$

In some examples, the design matrix may be provided by, accessed from, and/or stored in a TSV file having multiple columns. For example, a first column of a TSV file for the design matrix may include identifiers (e.g., a set of unique names and/or characters) corresponding to the first column of the above-described TSV file for the unit-based input data. A second column of the TSV file for the design matrix may include identifiers (e.g., a set of unique names and/or characters) corresponding to the first column of the above-described TSV file for the criteria-based input data. A third column of the TSV file for the design matrix may include values (e.g., double precision numerical values) for the contribution of respective ones of the units to respective ones of the criteria without weighting. In such an example, the respective values of the third column of the TSV file for the design matrix are positive and not equal to zero (0). In some such examples, if there is no record for a given pair of unit and criteria identifiers in the TSV file for the design matrix, the data is assumed to be zero (0).

In other examples, the design matrix may be provided by, accessed from, and/or stored in a file having a format that differs from that of a TSV file. For example, the design matrix may be provided by, accessed from, and/or stored in a CSV file, or some other type of data file.

In some examples, the apparatus, systems and methods disclosed herein for calibrating data using relaxed benchmark constraints determine a set of calibrated weights (e.g., calibrated projection weights to be applied to panelist and/or reporting data) based in part on model parameter data to be incorporated into the soft calibration model. In some examples, the model parameter data includes a Huber function parameter associated with target loss and a budget parameter associated with weight loss. As described above in connection with the target loss function of Equation 7, a Huber loss function $H_\phi(\cdot)$ may be implemented to measure the distance between (a) a panelist and/or reporting value captured by a criteria variable, and (b) a corresponding target. The Huber loss function is parametric in $\phi$. Identification of a Huber function parameter ($\phi$) applicable across all criteria enables a fixed target loss to be computed.

Target loss and the weight loss are conflicting objectives of the soft calibration process. For example, the smaller that the value of the target loss becomes, the larger that the value of the weight loss becomes by necessity, and vice-versa. In some examples, to obtain a unique solution, the target loss may be minimized and a constraint may be placed on the value that the weight loss is allowed to obtain. As used herein, the term "budget" refers to a constraint placed on the value that the weight loss is allowed to obtain. In some examples, a budget parameter ($\theta$) is an upper bound (e.g., $\theta \in \mathbb{R}_{>0}$) associated with the weight loss. An example constraint corresponding to the budget parameter ($\theta$) may be expressed and/or defined as follows:

$$G(x) \leq \theta \text{ for } \theta \in \mathbb{R}_{>0} \quad \text{Equation 16}$$

Based on the above-described criteria-based input data (e.g., criteria associated with panelist and/or reporting data, criteria variables for the criteria, targets for the criteria variables, lower bounds for the criteria variables, upper bounds for the criteria variables, scaling parameters for the criteria variables, and importance parameters for the criteria variables), target loss function, unit-based input data (e.g., units associated with panelist and/or reporting data, unit variables for the units, initial weights for the unit variables, lower bounds for the unit variables, upper bounds for the unit variables, and size parameters for the unit variables), weight loss function, matrix data, and model parameter data, an example calibration model to calibrate data using relaxed benchmark constraints (e.g., an example soft calibration model) may be expressed and/or defined as follows:

$$\min F(y)$$
$$\text{subject to: } Ax = y$$
$$l^x \leq x \leq u^x$$
$$l^y \leq y \leq u^y$$
$$G(x) \leq \theta \quad \text{Equation 17}$$

The soft calibration model of Equation 17 may be implemented and/or executed to provide a unique solution whereby respective calibrated panelist and/or reporting values from among a set of calibrated panelist and/or reporting values are close in value to, but not necessarily equal to, respective target and/or benchmark values from among a corresponding set of target and/or benchmark values. Implementation and/or execution of the soft calibration model of Equation 17 also results in a determination and/or identification of the calibrated weights (e.g., optimized weights). As the initial weights ($x^0$) are known and fixed, the calibrated weights may be identified and/or determined based on the weight adjustments per unit $$\frac{x_i}{x_i^0}.$$

In some examples, calibrated weights determined as a result of executing the soft calibration model of Equation 17 may be provided by, accessed from, and/or stored in a TSV file having multiple columns. For example, a first column of a TSV file for the calibrated weights may include identifiers (e.g., a set of unique names and/or characters) corresponding to the first column of the above-described TSV file for the unit-based input data. A second column of the TSV file for the calibrated weights may include values (e.g., double precision numerical values) for the weight adjustment ($x^{adj}$) of each unit or, alternatively, the calibrated weight of each unit. In other examples, calibrated weights determined as a result of executing the soft calibration model of Equation 17 may be provided by, accessed from, and/or stored in a file having a format that differs from that of a TSV file. For example, calibrated weights determined as a result of executing the soft calibration model of Equation 17 may be provided by, accessed from, and/or stored in a CSV file, or some other type of data file.

Table 1 below provides an example of panelist and/or reporting data to be calibrated:

TABLE 1

| AgeGroup | Sex | Population | RetailerA | RetailerB |
|---|---|---|---|---|
| 15-34 | Male | 40199347 | 28.68 | 1.28 |
| 35-54 | Male | 40945028 | 82.78 | 2.32 |
| 55+ | Male | 26054981 | 21.72 | 0.46 |
| 15-34 | Female | 38876268 | 27.97 | 1.82 |
| 35-54 | Female | 41881451 | 37.10 | 2.00 |
| 55+ | Female | 33211456 | 13.82 | 0.42 |

The panelist and/or reporting data of Table 1 includes two demographic dimensions: (1) an age group dimension having three levels: and (2) a sex dimension having two levels. A population estimate is provided for each intersection of age and group dimensions. The panelist and/or reporting data of Table 1 also includes the average spending per person for two retailers (e.g., RetailerA and RetailerB).

Criteria-based input data may be associated with the panelist and/or reporting data of Table 1 above. For example, Table 2 below provides an example of criteria-based input data associated with the panelist and/or reporting data of Table 1 in a scenario where the scaling parameters (c) described above in connection with Equation 5 have been set to equal the corresponding targets (t), and where the importance parameters (v) described above in connection with Equation 6 have been set to a value of 1.00 for the demographic targets:

TABLE 2

| criteria ID | target | ly | uy | v | c |
|---|---|---|---|---|---|
| demo::Sex::Male | 107199356 | 107199356 | 107199356 | 1.00 | 107199356 |
| demo::Sex::Female | 113969175 | 113969175 | 113969175 | 1.00 | 113969175 |
| demo::AgeGroup::15-34 | 79075615 | 79075615 | 79075615 | 1.00 | 79075615 |
| demo::AgeGroup::35-54 | 82826479 | 82826479 | 82826479 | 1.00 | 82826479 |
| demo::AgeGroup::55+ | 59266437 | 59266437 | 59266437 | 1.00 | 59266437 |
| volumetric::RetailerA | 9029255672 | 6566731398 | 9850097097 | 90600.30 | 8208414247 |
| volumetric::RetailerB | 310554470 | 261519553 | 392279330 | 18080.36 | 326899442 |

Unit-based input data may also be associated with the panelist and/or reporting data of Table 1 above. For example, Table 3 below provides an example of unit-based input data associated with the panelist and/or reporting data of Table 1 in a scenario where the initial weights ($x^0$) are set to equal the population estimates of the panelist and/or reporting data at intersection level:

TABLE 3

| unit ID | x0 | lx | ux | size |
|---|---|---|---|---|
| 14-34::Male | 40199347 | 20099674 | 80398694 | 29.96 |
| 35-54::Male | 40945028 | 20472514 | 81890056 | 85.10 |
| 55+::Male | 26054981 | 13027491 | 52109962 | 22.18 |
| 15-34::Female | 38876268 | 19438134 | 77752536 | 29.79 |
| 35-54::Female | 41881451 | 20940726 | 83762902 | 39.10 |
| 55+::Female | 33211456 | 16605728 | 66422912 | 14.24 |

Table 4 below provides an example of a design matrix including matrix data associated with the criteria-based input data of Table 2 above and the unit-based input data of Table 3 above:

TABLE 4

| unit ID | criteria ID | a |
|---|---|---|
| 15-34::Male | demo::Sex::Male | 1.00 |
| 35-54::Male | demo::Sex:Male | 1.00 |
| 55+::Male | demo::Sex::Male | 1.00 |
| 15-34::Female | demo::Sex::Female | 1.00 |
| 35-54::Female | demo::Sex::Fernale | 1.00 |
| 55+::Female | demo::Sex::Female | 1.00 |
| 15-34::Male | demo::AgeGroup::15-34 | 1.00 |
| 35-54::Male | demo::AgeGroup::35-54 | 1.00 |
| 55+::Male | demo::AgeGroup::55+ | 1.00 |
| 15-34::Female | demo::AgeGroup::15-34 | 1.00 |
| 35-54::Female | demo::AgeGroup::35-54 | 1.00 |
| 55+::Female | demo::AgeGroup::55+ | 1.00 |
| 15-34::Male | volumetric::RetailerA | 28.68 |
| 35-54::Male | volumetric::RetailerA | 82.78 |
| 55+::Male | volumetric::RetailerA | 21.72 |
| 15-34::Female | volumetric::RetailerA | 27.97 |
| 35-54::Female | volumetric::RetailerA | 37.10 |
| 55+::Female | volumetric::RetailerA | 13.82 |
| 15-34::Male | volumeiric::RetailerB | 1.28 |
| 35-54::Male | volumetric::RetailerB | 2.32 |
| 55+::Male | volumetric::RetailerB | 0.46 |
| 15-34::Female | volumetric::RetailerB | 1.82 |
| 35-54::Female | volumetric::RetailerB | 2.00 |
| 55+::Female | volumetric::RetailerB | 0.47 |

Table 5 below provides an example of calibrated weights data resulting from executing the soft calibration model of Equation 17 based in part on the criteria-based input data of Table 2, the unit-based input data of Table 3, and the matrix data of Table 4, in a scenario where the budget parameter ($\theta$) has been set to a value of 0.35 and the Huber function parameter ($\phi$) has been set to a value of 0.50:

TABLE 5

| unit ID | xadj |
|---|---|
| 15-34::Male | 0.8789425 |
| 35-54::Male | 1.4060901 |
| 55+::Male | 0.5486109 |
| 15-34::Female | 1.1251775 |
| 35-54::Female | 0.6029897 |
| 55+::Female | 1.3541228 |

In some circumstances, execution of the soft calibration model of Equation 17 described above may result in the soft calibration model performing in an unexpected manner. One such set of circumstances occurs when two conditions are present: (1) the target loss function (F(y)) has a flat region (D) (e.g., a flat region (D) expressed and/or defined as $\exists D \subseteq \mathbb{R}_{\geq 0}^m : y_1, y_2 \in D \Rightarrow |F(y_1) - F(y_2)| \approx 0$); and (2) the budget parameter ($\theta$) is large enough to allow the minimization procedure of the soft calibration model of Equation 17 to reach the flat region (D) of the target loss function (F(y)).

For example, in the case of a totally flat region (D) (e.g., where $|F(y_1) - F(y_2)| = 0$ in condition (1) above), the soft calibration model of Equation 17 does not specify which one of the countless possibilities is to be preferred. Different solvers might choose to implement heuristics picking up one of the edges of the optimal set or, alternatively, a central point of this set. A particular case is when there is a totally flat optimal region for the target loss and all criteria are fulfilled exactly (e.g., where $y \in D \Rightarrow F(y) = 0$). This particular case reduces the soft calibration problem to the traditional case of statistical weight calibration. Yet, unlike the traditional calibration approach, the soft calibration model of Equation 17 does not capture a preference for a solution that minimizes the weight loss. As another example, in the case of a nearly flat region (D) (e.g., where $|F(y_1) - F(y_2)|$ is negligible and/or close to machine precision), implementation heuristics become unreliable, and may result in a progressively increasing weight loss function (G(x)) that provides no meaningful improvement in relation to the target attainment. In some such examples, execution of the soft calibration model may result in calibrated weights that do not provide a unique solution for the executed soft calibration model.

In some examples, a stability parameter ($\gamma$) may be incorporated into (e.g., appended to) the soft calibration model of Equation 17 to remedy and/or prevent unexpected performance of the soft calibration model resulting from the above-described circumstances and/or conditions. The stability parameter ($\gamma$) reduces the influence of the budget parameter ($\theta$) on the soft calibration model. For example, incorporation of the stability parameter ($\gamma$) may prevent the minimization procedure of the soft calibration model of Equation 17 from reaching the flat region (D) of the target loss function (F(y)). In some examples, the stability parameter ($\gamma$) is included as part of the model parameter data described above. In some examples, the stability parameter ($\gamma$) may be incorporated into the soft calibration model of Equation 17 by adding the product of the stability parameter ($\gamma$) and the weight loss function (G(x)) to the target loss function (F(y)). In such examples, the revised soft calibration model may be expressed and/or defined as follows:

$$\min F(y) + \gamma G(x)$$

subject to: $Ax = y$ $$l^x \leq x \leq u^x$$

$$l^y \leq y \leq u^y$$

$$G(x) \leq \theta \qquad \qquad \text{Equation 18}$$

In some examples, the stability parameter ($\gamma$) may be determined and/or provided at run-time. As the target loss function (F(y)) and the weight loss function (G(x)) are both scaled to be measureless (e.g. both are non-negative, and both are expected to be not much larger than 1), the stability parameter ($\gamma$) may preferably have a value between 0.00001 and 0.01 (e.g., comparable to a precision sensitivity associated with the soft calibration model). In some examples, the value of the stability parameter ($\gamma$) may be increased until the calibrated weights that result from executing the soft calibration model provide a unique solution for the soft calibration model. Thus, implementation and/or incorporation of the stability parameter ($\gamma$) may reduce the occurrence of errors (e.g., the generation of calibrated weights providing non-unique solutions) attributable to and/or arising from an influence of the value of the budget parameter ($\theta$) on the soft calibration model.

The soft calibration model of Equation 18 may be implemented and/or executed to provide a unique solution whereby respective calibrated panelist and/or reporting values from among a set of calibrated panelist and/or reporting values are close in value to, but not necessarily equal to, respective target and/or benchmark values from among a corresponding set of target and/or benchmark values. Implementation and/or execution of the soft calibration model of Equation 18 also results in a determination and/or identification of the calibrated weights (e.g., optimized weights). As the initial weights ($x^0$) are known and fixed, the calibrated weights may be identified and/or determined based on the weight adjustments per unit $$\frac{x_i}{x_i^0}.$$

In some examples, calibrated weights determined as a result of executing the soft calibration model of Equation 18 may be provided by, accessed from, and/or stored in a TSV file having multiple columns. For example, a first column of a TSV file for the calibrated weights may include identifiers (e.g., a set of unique names and/or characters) corresponding to the first column of the above-described TSV file for the unit-based input data. A second column of the TSV file for the calibrated weights may include values (e.g., double precision numerical values) for the weight adjustment of each unit or, alternatively, the calibrated weight of each unit. In other examples, calibrated weights determined as a result of executing the soft calibration model of Equation 18 may be provided by, accessed from, and/or stored in a file having a format that differs from that of a TSV file. For example, calibrated weights determined as a result of executing the soft calibration model of Equation 18 may be provided by, accessed from, and/or stored in a CSV file, or some other type of data file.

FIG. 1 is a block diagram of an example calibration apparatus 100 constructed in accordance with the teachings of this disclosure. The calibration apparatus 100 of FIG. 1 may be implemented to calibrate panelist and/or reporting data using relaxed benchmark constraints incorporated into a soft calibration model (e.g., the example soft calibration model of Equation 17 or the example soft calibration model of Equation 18 described above). In the illustrated example of FIG. 1, the calibration apparatus 100 includes an example criteria-based input determiner 102, an example unit-based input determiner 104, an example matrix determiner 106, an example model parameter determiner 108, an example calibration engine 110, an example user interface 112, and an example memory 114.

The example criteria-based input determiner 102 of FIG. 1 determines and/or identifies example criteria-based input data 118 to be incorporated into an example target loss function 120 of a soft calibration model to be executed by the example calibration engine 110 of the calibration apparatus 100 of FIG. 1. The criteria-based input data 118 determined and/or identified by the criteria-based input determiner 102 may be of any type, form and/or format (e.g., a TSV file, a CSV file, etc.), and may be stored in a computer-readable storage medium such as the example memory 114 of FIG. 1 described below. In some examples, the criteria-based input determiner 102 of FIG. 1 determines and/or identifies the criteria-based input data 118 by accessing and/or obtaining the criteria-based input data 118 from the memory 114 of FIG. 1. In other examples, the criteria-based input determiner 102 of FIG. 1 determines and/or identifies criteria-based input data 118 received from the example user interface 112 of FIG. 1 described below. In such other examples, the criteria-based input determiner 102 of FIG. 1 may cause the memory 114 of FIG. 1 to store the received criteria-based input data 118.

In some examples, the criteria-based input data 118 to be determined and/or identified by the criteria-based input determiner 102 of FIG. 1 may include criteria associated with example panelist and/or reporting data (e.g., survey data) 116, criteria variables for the criteria, targets for the criteria variables, lower bounds for the criteria variables, upper bounds for the criteria variables, scaling parameters for the criteria variables, and/or importance parameters for the criteria variables. In some examples, the criteria of the criteria-based input data 118 may be expressed in a manner consistent with Equation 1 described above. In some examples, the criteria variables of the criteria-based input data 118 may be expressed in a manner consistent with Equation 2 described above. In some examples, the targets of the criteria-based input data 118 may be expressed in a manner consistent with Equation 3 described above. In some examples, the lower and upper bounds of the criteria-based input data 118 may be expressed in a manner consistent with Equation 4 described above. In some examples, the scaling parameters of the criteria-based input data 118 may be expressed in a manner consistent with Equation 5 described above. In some examples, the importance parameters of the criteria-based input data 118 may be expressed in a manner consistent with Equation 6 described above. In some examples, the target loss function 120 into which the criteria-based input data 118 determined and/or identified by the criteria-based input determiner 102 of FIG. 1 is to be incorporated may be expressed in a manner consistent with Equation 7 described above.

The example unit-based input determiner 104 of FIG. 1 determines and/or identifies example unit-based input data 122 to be incorporated into an example weight loss function 124 of the soft calibration model to be executed by the example calibration engine 110 of the calibration apparatus 100 of FIG. 1. The unit-based input data 122 determined and/or identified by the unit-based input determiner 104 may be of any type, form and/or format (e.g., a TSV file, a CSV file, etc.), and may be stored in a computer-readable storage medium such as the example memory 114 of FIG. 1 described below. In some examples, the unit-based input determiner 104 of FIG. 1 determines and/or identifies the unit-based input data 122 by accessing and/or obtaining the unit-based input data 122 from the memory 114 of FIG. 1. In other examples, the unit-based input determiner 104 of FIG. 1 determines and/or identifies unit-based input data 122 received from the example user interface 112 of FIG. 1 described below. In such other examples, the unit-based input determiner 104 of FIG. 1 may cause the memory 114 of FIG. 1 to store the received unit-based input data 122.

In some examples, the unit-based input data 122 to be determined and/or identified by the unit-based input determiner 104 of FIG. 1 may include units associated with the panelist and/or reporting data 116, unit variables for the units, initial weights for the unit variables, lower bounds for the unit variables, upper bounds for the unit variables, and/or size parameters for the unit variables. In some examples, the units of the unit-based input data 122 may be expressed in a manner consistent with Equation 8 described above. In some examples, the unit variables of the unit-based input data 122 may be expressed in a manner consistent with Equation 9 described above. In some examples, the initial weights of the unit-based input data 122 may be expressed in a manner consistent with Equation 10 described above. In some examples, the lower and upper bounds of the unit-based input data 122 may be expressed in a manner consistent with Equation 11 described above. In some examples, the size parameters of the unit-based input data 122 may be expressed in a manner consistent with Equation 12 described above. In some examples, the weight loss function 124 into which the unit-based input data 122 determined and/or identified by the unit-based input determiner 104 of FIG. 1 is to be incorporated may be expressed in a manner consistent with Equation 13 described above.

The example matrix determiner 106 of FIG. 1 determines, generates, derives and/or identifies example matrix data 126 to be incorporated into the soft calibration model to be executed by the example calibration engine 110 of the calibration apparatus 100 of FIG. 1. The matrix data 126 determined, generated, derived and/or identified by the matrix determiner 106 of FIG. 1 may be of any type, form and/or format (e.g., a TSV file, a CSV file, etc.), and may be stored in a computer-readable storage medium such as the example memory 114 of FIG. 1 described below. In some examples, the matrix determiner 106 of FIG. 1 determines and/or identifies the matrix data 126 by accessing and/or obtaining the matrix data 126 from the memory 114 of FIG. 1. In other examples, the matrix determiner 106 of FIG. 1 determines and/or identifies matrix data 126 received from the example user interface 112 of FIG. 1 described below. In such other examples, the matrix determiner 106 of FIG. 1 may cause the memory 114 of FIG. 1 to store the received matrix data 126.

In some examples, the matrix determiner 106 of FIG. 1 determines, generates, derives and/or identifies the matrix data 126 based on the example criteria-based input data 118 of FIG. 1 and the example unit-based input data 122 of FIG. 1. In some examples, the matrix data 126 determined, generated derived and/or identified by the matrix determiner 106 of FIG. 1 may be expressed in a manner consistent with Equation 14 and/or Equation 15 described above. In some examples, the matrix data 126 determined, generated, derived and/or identified by the matrix determiner 106 may capture relationships between the criteria of the criteria-based input data 118 and the units of the unit-based input data 122. For example, the non-expanded contribution of each unit to each criterion may be captured by the matrix data 126.

The example model parameter determiner 108 of FIG. 1 determines and/or identifies example model parameter data 128 to be incorporated into the soft calibration model to be executed by the example calibration engine 110 of the calibration apparatus 100 of FIG. 1. The model parameter data 128 determined and/or identified by the model parameter determiner 108 of FIG. 1 may be of any type, form and/or format, and may be stored in a computer-readable storage medium such as the example memory 114 of FIG. 1 described below. In some examples, the model parameter determiner 108 of FIG. 1 determines and/or identifies the model parameter data 128 by accessing and/or obtaining the model parameter data 128 from the memory 114 of FIG. 1. In other examples, the model parameter determiner 108 of FIG. 1 determines and/or identifies model parameter data 128 received from the example user interface 112 of FIG. 1 described below. In such other examples, the model parameter determiner 108 of FIG. 1 may cause the memory 114 of FIG. 1 to store the received model parameter data 128.

In some examples, the model parameter data 128 to be determined and/or identified by the model parameter determiner 108 of FIG. 1 may include a Huber function parameter, a budget parameter, and/or a stability parameter. In some examples, the budget parameter of the model parameter data 128 determined and/or identified by the model parameter determiner 108 of FIG. 1 may be expressed in a manner consistent with Equation 16 described above.

The example calibration engine 110 of FIG. 1 builds, constructs and/or compiles the soft calibration model to be executed by the calibration apparatus 100. In some examples, the calibration engine 110 of FIG. 1 builds, constructs and/or compiles the soft calibration model based on the criteria-based input data 118, the target loss function 120, the unit-based input data 122, the weight loss function 124, the matrix data 126, and the model parameter data 128 of FIG. 1. In some examples, the soft calibration model built, constructed and/or compiled by the calibration engine 110 of FIG. 1 may be expressed in a manner consistent with Equation 17 described above. In other examples, the soft calibration model built, constructed and/or compiled by the calibration engine 110 of FIG. 1 may be expressed in a manner consistent with Equation 18 described above. The calibration engine 110 of FIG. 1 executes and/or controls the execution of the built, constructed and/or compiled soft calibration model.

In the illustrated example of FIG. 1, the calibration engine 110 includes an example calibrated weights determiner 130. The calibrated weights determiner 130 of FIG. 1 determines and/or calculates example calibrated weights data 132 in response to execution of the soft calibration model by the calibration engine 110. In some examples, in response to the calibration engine 110 executing the soft calibration model, the calibrated weights determiner 130 of FIG. 1 determines the calibrated weights data 132 based on the criteria-based input data 118, the target loss function 120, the unit-based input data 122, the weight loss function 124, the matrix data 126, and the model parameter data 128 incorporated into the executed soft calibration model. In some examples, the calibrated weights determiner 130 of FIG. 1 may determine and/or calculate the calibrated weights data 132 based on adjusted calibration weights output by the soft calibration model. In some examples, the calibrated weights determiner 130 of FIG. 1 may cause the calibrated weights data 132 to be presented (e.g., displayed) via the example user interface 112 of FIG. 1. The calibrated weights data 132 determined and/or calculated by the calibrated weights determiner 130 of FIG. 1 may be of any type, form and/or format (e.g., a TSV file, a CSV file, etc.), and may be stored in a computer-readable storage medium such as the example memory 114 of FIG. 1 described below.

In the illustrated example of FIG. 1, the calibration engine 110 also includes an example calibrated reporting data determiner 134. The example calibrated reporting data determiner 134 of FIG. 1 determines and/or calculates example calibrated panelist and/or reporting data 136. In some examples, the calibrated panelist and/or reporting data 136 determined and/or calculated by the calibrated reporting data determiner 134 of FIG. 1 is based on initial panelist and/or reporting data (e.g., the panelist and/or reporting data 116 of FIG. 1) and the calibrated weights data 132 determined and/or calculated by the calibrated weights determiner 130 of FIG. 1. For example, the calibrated reporting data determiner 134 of FIG. 1 may determine and/or calculate the calibrated panelist and/or reporting data 136 by applying the calibrated weights data 132 to the panelist and/or reporting data 116 of FIG. 1. In some examples, the calibrated reporting data determiner 134 of FIG. 1 may cause the calibrated panelist and/or reporting data 136 to be presented (e.g., displayed) via the example user interface 112 of FIG. 1. The calibrated panelist and/or reporting data 136 determined and/or calculated by the calibrated reporting data determiner 134 of FIG. 1 may be of any type, form and/or format (e.g., a TSV file, a CSV file, etc.), and may be stored in a computer-readable storage medium such as the example memory 114 of FIG. 1 described below.

In the illustrated example of FIG. 1, the calibration engine 110 also includes an example calibration model validator 138. The example calibrated reporting data determiner 134 of FIG. 1 validates the soft calibration model executed by the example calibration engine 110 of FIG. 1. For example, the calibration model validator 138 of FIG. 1 may validate the soft calibration model executed by the calibration engine 110 of FIG. 1 by determining whether the calibrated weights resulting from execution of the soft calibration model (e.g., the calibrated weights data 132 determined by the calibrated weights determiner 130 of FIG. 1) provide a unique solution for the executed soft calibration model.

In some examples, if the calibration model validator 138 of FIG. 1 determines that the resultant calibrated weights do not provide a unique solution for the executed soft calibration model, the calibration model validator 138 may determine whether the executed soft calibration model included a stability parameter. For example, the calibration model validator 138 of FIG. 1 may determine that a soft calibration model expressed in a manner consistent with Equation 17 described above does not include a stability parameter. If the calibration model validator 138 of FIG. 1 determines that the executed soft calibration model does not include a stability parameter, the calibration model validator 138 may incorporate a stability parameter into the soft calibration model, and may further cause the calibration engine 110 of FIG. 1 to re-execute the soft calibration model (e.g., the soft calibration model including the stability parameter) to re-determine the calibrated weights. For example, the calibration model validator 138 of FIG. 1 may incorporate a stability parameter expressed in a manner consistent with Equation 16 described above into the soft calibration model expressed in a manner consistent with Equation 17 described above to provide the soft calibration model expressed in a manner consistent with Equation 18 described above (e.g., a soft calibration model including a stability parameter).

The example user interface 112 of FIG. 1 facilitates interactions and/or communications between an end user and the criteria-based input determiner 102, the unit-based input determiner 104, the matrix determiner 106, the model parameter determiner 108, the calibration engine 110, the memory 114, the calibrated weights determiner 130, the calibrated reporting data determiner 134, the calibration model validator 138, and/or, more generally, the calibration apparatus 100 of FIG. 1. The user interface 112 of FIG. 1 includes one or more input device(s) 140 via which the user may input information and/or data to the criteria-based input determiner 102, the unit-based input determiner 104, the matrix determiner 106, the model parameter determiner 108, the calibration engine 110, the memory 114, the calibrated weights determiner 130, the calibrated reporting data determiner 134, the calibration model validator 138, and/or, more generally, the calibration apparatus 100. For example, the one or more input device(s) 140 of the user interface 112 may include a button, a switch, a keyboard, a mouse, a microphone, and/or a touchscreen that enable(s) the user to convey data and/or commands to the criteria-based input determiner 102, the unit-based input determiner 104, the matrix determiner 106, the model parameter determiner 108, the calibration engine 110, the memory 114, the calibrated weights determiner 130, the calibrated reporting data determiner 134, the calibration model validator 138, and/or, more generally, the calibration apparatus 100 of FIG. 1.

The user interface 112 of FIG. 1 also includes one or more output device(s) 142 via which the user interface 112 presents information and/or data in visual and/or audible form to the user. For example, the one or more output device(s) 142 of the user interface 112 may include a light emitting diode, a touchscreen, and/or a liquid crystal display for presenting visual information, and/or a speaker for presenting audible information. In some examples, the one or more output device(s) 142 of the user interface 112 may present and/or display the example calibrated weights data 132 and/or the example calibrated panelist and/or reporting data 136 resulting from execution of the soft calibration model by the example calibration engine 110 of FIG. 1. In some examples, the one or more output device(s) 142 of the user interface 112 may be directed to present and/or display the example calibrated weights data 132 and/or the example calibrated panelist and/or reporting data 136 by one or more of the calibration engine 110, the calibrated weights determiner 130, the calibrated reporting data determiner 134, the calibration model validator 138, and/or, more generally, the calibration apparatus 100 of FIG. 1. Data and/or information that is presented and/or received via the user interface 112 of FIG. 1 may be of any type, form and/or format, and may be stored in a computer-readable storage medium such as the example memory 114 of FIG. 1 described below.

The example memory 114 of FIG. 1 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The data and/or information stored in the memory 114 may be stored in any file and/or data structure format, organization scheme, and/or arrangement. The memory 114 is accessible to one or more of the example criteria-based input determiner 102, the example unit-based input determiner 104, the example matrix determiner 106, the example model parameter determiner 108, the example calibration engine 110, the example user interface 112, the example calibrated weights determiner 130, the example calibrated reporting data determiner 134, and/or the example calibration model validator 138 of FIG. 1, and/or, more generally, to the calibration apparatus of FIG. 1.

In some examples, the memory 114 of FIG. 1 stores data and/or information received via the one or more input device(s) 140 of the user interface 112 of FIG. 1. In some examples, the memory 114 stores data and/or information to be presented via the one or more output device(s) 142 of the user interface 112 of FIG. 1. In some examples, the memory 114 stores panelist and/or reporting data 116. In some examples, the memory 114 stores criteria-based input data 118 including criteria associated with the panelist and/or reporting data 116, criteria variables for the criteria, targets for the criteria variables, lower bounds for the criteria variables, upper bounds for the criteria variables, scaling parameters for the criteria variables, and/or importance parameters for the criteria variables. In some examples, the memory 114 stores a target loss function 120 to be incorporated into the soft calibration model to be executed by the calibration engine 110 of FIG. 1. In some examples, the memory 114 stores unit-based input data 122 including units associated with the panelist and/or reporting data 116, unit variables for the units, initial weights for the unit variables, lower bounds for the unit variables, upper bounds for the unit variables, and/or size parameters for the unit variables. In some examples, the memory 114 stores a weight loss function 124 to be incorporated into the soft calibration model to be executed by the calibration engine 110 of FIG. 1. In some examples, the memory 114 stores matrix data 126. In some examples, the memory 114 stores model parameter data 128 including a Huber function parameter, a budget parameter, and/or a stability parameter. In some examples, the memory 114 stores calibrated weights data 132 determined and/or calculated by the calibrated weights determiner 130 and/or, more generally, by the calibration engine 110 of FIG. 1. In some examples, the memory 114 stores calibrated panelist and/or reporting data 136 determined and/or calculated by the calibrated reporting data determiner 134 and/or, more generally, by the calibration engine 110 of FIG. 1.

While an example manner of implementing a calibration apparatus 100 is illustrated in FIG. 1, one or more of the elements, processes and/or devices illustrated in FIG. 1 may be combined, divided, re-arranged, omitted, eliminated and/or implemented in any other way. Further, the example criteria-based input determiner 102, the example unit-based input determiner 104, the example matrix determiner 106, the example model parameter determiner 108, the example calibration engine 110, the example user interface 112, the example memory 114, the example calibrated weights determiner 130, the example calibrated reporting data determiner 134, and/or the example calibration model validator 138 of FIG. 1 may be implemented by hardware, software, firmware and/or any combination of hardware, software and/or firmware. Thus, for example, any of the example criteria-based input determiner 102, the example unit-based input determiner 104, the example matrix determiner 106, the example model parameter determiner 108, the example calibration engine 110, the example user interface 112, the example memory 114, the example calibrated weights determiner 130, the example calibrated reporting data determiner 134, and/or the example calibration model validator 138 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example criteria-based input determiner 102, the example unit-based input determiner 104, the example matrix determiner 106, the example model parameter determiner 108, the example calibration engine 110, the example user interface 112, the example memory 114, the example calibrated weights determiner 130, the example calibrated reporting data determiner 134, and/or the example calibration model validator 138 of FIG. 1 is/are hereby expressly defined to include a tangible computer-readable storage device or storage disk such as a memory, a digital versatile disk (DVD), a compact disk (CD), a Blu-ray disk, etc, storing the software and/or firmware. Further still, the example calibration apparatus 100 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions which may be executed to calibrate data using relaxed benchmark constraints are shown in FIGS. 2-6. In these examples, the machine-readable instructions may implement one or more program(s) for execution by a processor such as the example processor 702 shown in the example processor platform 700 discussed below in connection with FIG. 7. The one or more program(s) may be embodied in software stored on a tangible computer readable storage medium such as a CD-ROM, a floppy disk, a hard drive, a digital versatile disk (DVD), a Blu-ray disk, or a memory associated with the processor 702 of FIG. 7, but the entire program(s) and/or parts thereof could alternatively be executed by a device other than the processor 702 of FIG. 7, and/or embodied in firmware or dedicated hardware. Further, although the example program(s) is/are described with reference to the flowcharts illustrated in FIGS. 2-6, many other methods for calibrating data using relaxed benchmark constrains man alternatively be used. For example, the order of execution of the blocks may be changed, and/or some of the blocks described may be changed, eliminated, or combined.

As mentioned above, the example instructions of FIGS. 2-6 may be stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example instructions of FIGS. 2-6 may be stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 2:
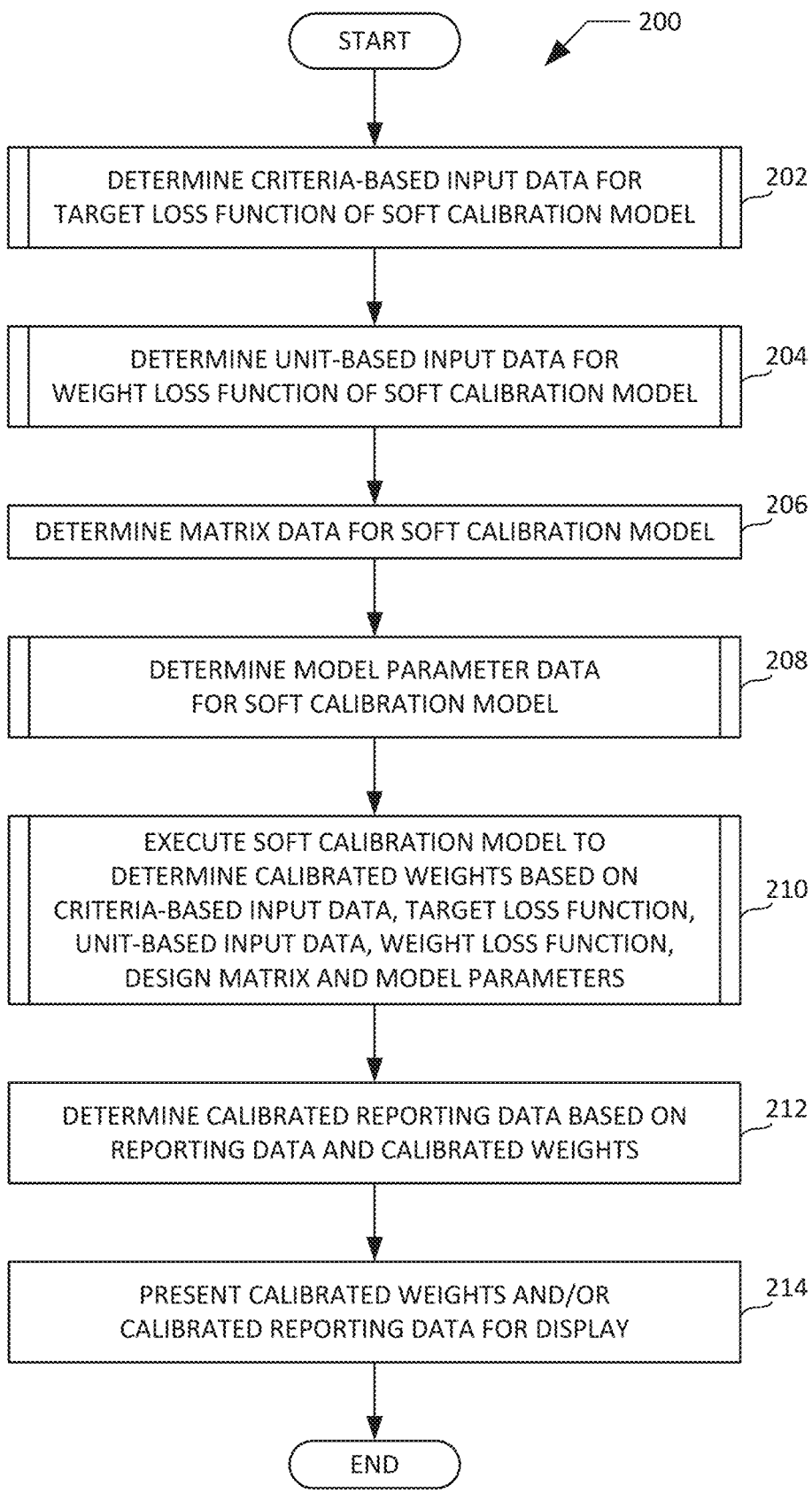
FIG. 2 is a flowchart representative of example machine readable instructions that may be executed at the example calibration apparatus of FIG. 1 to calibrate data using relaxed benchmark constraints incorporated into a soft calibration model.

FIG. 2 is a flowchart representative of example machine readable instructions 200 that may be executed at the example calibration apparatus 100 of FIG. 1 to calibrate data using relaxed benchmark constraints. The example program 200 of FIG. 2 may be implemented to calibrate panelist and/or reporting data using relaxed benchmark constraints incorporated into a soft calibration model (e.g., the example soft calibration model of Equation 17 or the example soft calibration model of Equation 18 described above).

The example program 200 of FIG. 2 begins when the example criteria-based input determiner 102 of FIG. 1 determines criteria-based input data for a target loss function of the soft calibration model (block 202). For example, the criteria-based input determiner 102 of FIG. 1 may determine and/or identify the example criteria-based input data 118 of FIG. 1 by accessing and/or obtaining the criteria-based input data 118 from the example memory 114 of FIG. 1, and/or by receiving the criteria-based input data 118 from the example user interface 112 of FIG. 1. In some examples, the criteria-based input data 118 determined and/or identified by the criteria-based input determiner 102 of FIG. 1 may include criteria associated with the example panelist and/or reporting data 116 of FIG. 1, criteria variables for the criteria, targets for the criteria variables, lower bounds for the criteria variables, upper bounds for the criteria variables, scaling parameters for the criteria variables, and/or importance parameters for the criteria variables. An example process that may be used to implement block 202 is further described below in connection with FIG. 3. Following block 202, control of the example program 200 of FIG. 2 proceeds to block 204.

At block 204, the example unit-based input determiner 104 of FIG. 1 determines unit-based input data for a weight loss function of the soft calibration model (block 204). For example, the unit-based input determiner 104 of FIG. 1 may determine and/or identify the example unit-based input data 122 of FIG. 1 by accessing and/or obtaining the unit-based input data 122 from the example memory 114 of FIG. 1, and/or by receiving the unit-based input data 122 from the example user interface 112 of FIG. 1. In some examples, the unit-based input data 122 determined and/or identified by the unit-based input determiner 104 of FIG. 1 may include units associated with the example panelist and/or reporting data 116 of FIG. 1, unit variables for the units, initial weights for the unit variables, lower bounds for the unit variables, upper bounds for the unit variables, and/or size parameters for the unit variables. An example process that may be used to implement block 204 is further described below in connection with FIG. 4. Following block 204, control of the example program 200 of FIG. 2 proceeds to block 206.

At block 206, the example matrix determiner 106 of FIG. 1 determines matrix data for the soft calibration model (block 206). For example, the matrix determiner 106 of FIG. 1 may determine and/or identify the example matrix data 126 of FIG. 1 by accessing and/or obtaining the matrix data 126 from the example memory 114 of FIG. 1, and/or by receiving the matrix data 126 from the example user interface 112 of FIG. 1. In some examples, the matrix determiner 106 of FIG. 1 determines and/or identifies the matrix data 126 based on the example criteria-based input data 118 of FIG. 1 and the example unit-based input data 122 of FIG. 1. In some examples, the matrix data 126 determined and/or identified by the matrix determiner 106 of FIG. 1 may be expressed in a manner consistent with Equation 14 and/or Equation 15 described above. Following block 206, control of the example program 200 of FIG. 2 proceeds to block 208.

At block 208, the example model parameter determiner 108 of FIG. 1 determines model parameter data for the soft calibration model (block 208). For example, the model parameter determiner 108 of FIG. 1 may determine and/or identify the example model parameter data 128 of FIG. 1 by accessing and/or obtaining the model parameter data 128 from the example memory 114 of FIG. 1, and/or by receiving the model parameter data 128 from the example user interface 112 of FIG. 1. In some examples, the model parameter data 128 to be determined and/or identified by the model parameter determiner 108 of FIG. 1 may include a Huber function parameter, a budget parameter, and/or a stability parameter. An example process that may be used to implement block 208 is further described below in connection with FIG. 5. Following block 208, control of the example program 200 of FIG. 2 proceeds to block 210.

At block 210, the example calibration engine 110 of FIG. 1 executes the soft calibration model to determine calibrated weights based on the criteria-based input data, the target loss function, the unit-based input data, the weight loss function, the design matrix, and the model parameters (block 210). For example, the calibration engine 110 of FIG. 1 may execute the soft calibration model based on the example criteria-based input data 118, the example target loss function 120, the example unit-based input data 122, the example weight loss function 124, the example matrix data 126, and the example model parameter data 128 of FIG. 1. In response to the calibration engine 110 of FIG. 1 executing the soft calibration model, the calibrated weights determiner 130 of FIG. 1 determines the example calibrated weights data 132 of FIG. 1 based on the criteria-based input data 118, the target loss function 120, the unit-based input data 122, the weight loss function 124, the matrix data 126, and the model parameter data 128 incorporated into the executed soft calibration model. In some examples, the calibrated weights determiner 130 of FIG. 1 may determine and/or calculate the calibrated weights data 132 based on adjusted calibration weights output by the soft calibration model.

In some examples, the model parameter data 128 incorporated into the soft calibration model to be executed at block 210 includes a stability parameter. In other examples, the model parameter data 128 incorporated into the soft calibration model to be executed at block 210 may lack a stability parameter. An example process that may be used to implement block 210 when the model parameter data 128 incorporated into the soft calibration model may lack a stability parameter is further described below in connection with FIG. 6. Following block 210, control of the example program 200 of FIG. 2 proceeds to block 212.

At block 212, the example calibrated reporting data determiner 134 of FIG. 1 determines calibrated panelist and/or reporting data based on initial panelist and/or reporting data and the calibrated weights (block 212). For example, the calibrated reporting data determiner 134 of FIG. 1 may determine and/or calculate the example calibrated panelist and/or reporting data 136 of FIG. 1 by applying the example calibrated weights data 132 of FIG. 1 determined and/or calculated by the calibrated weights determiner 130 of FIG. 1 to the example panelist and/or reporting data 116 of FIG. 1. Following block 212, control of the example program 200 of FIG. 2 proceeds to block 214.

At block 214, the example user interface 112 of FIG. 1 presents the calibrated weights, and/or presents the calibrated panelist and/or reporting data, for display (block 214). For example, the user interface 112 of FIG. 1 may present (e.g., display) the example calibrated weights data 132 of FIG. 1 determined and/or calculated by the calibrated weights determiner 130 of FIG. 1. The user interface 112 of FIG. 1 may additionally and/or alternatively present (e.g., display) the example calibrated panelist and/or reporting data 136 of FIG. 1 determined and/or calculated by the calibrated reporting data determiner 134 of FIG. 1. Following block 214, the example program 200 of FIG. 2 ends.

Figure 3:
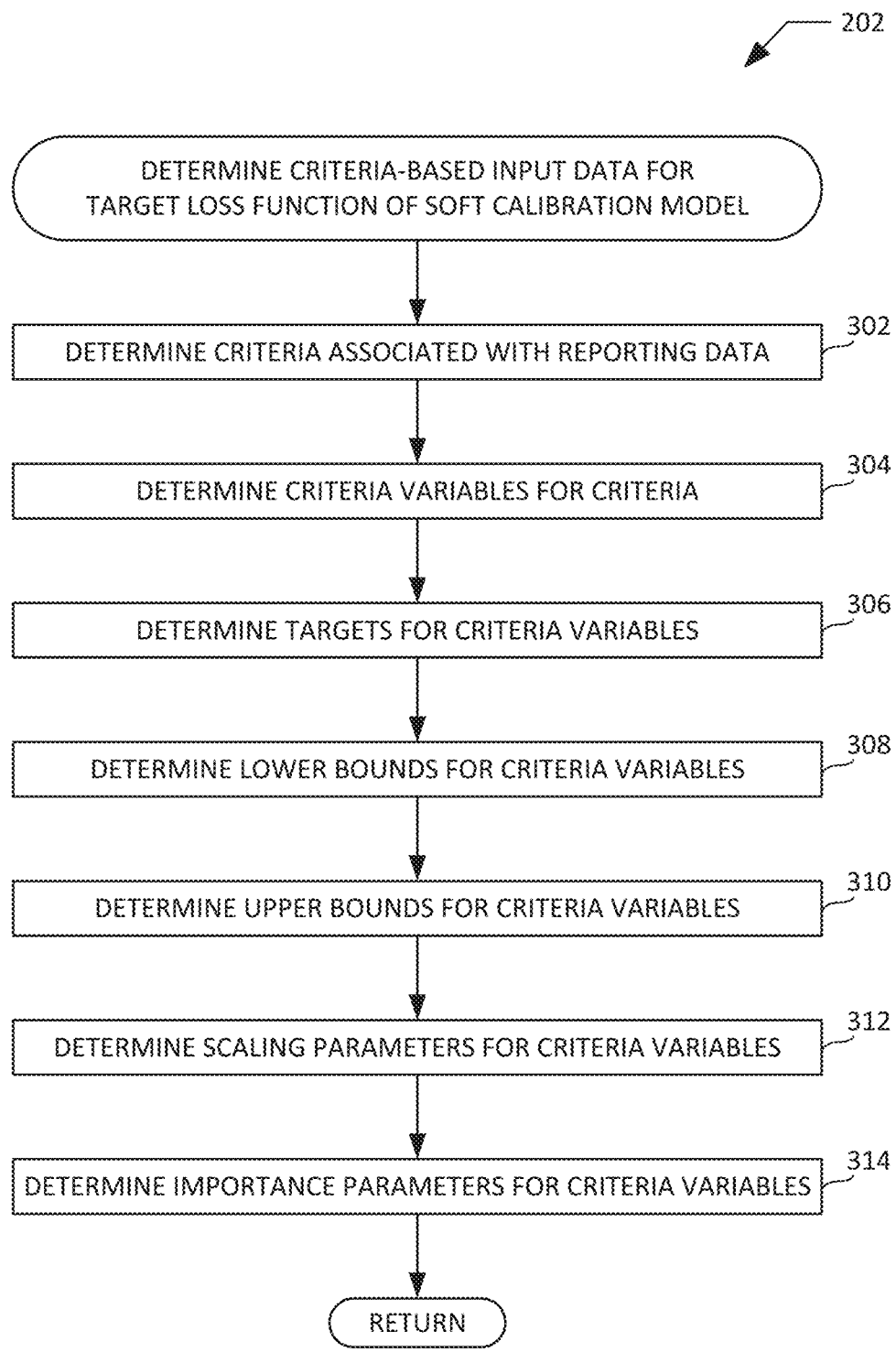
FIG. 3 is a flowchart representative of example machine readable instructions that may be executed at the example calibration apparatus of FIG. 1 to determine criteria-based input data for the target loss function of the soft calibration model to be executed by the calibration apparatus.

FIG. 3 is a flowchart representative of example machine readable instructions 202 that may be executed at the example calibration apparatus 100 of FIG. 1 to determine criteria-based input data for the target loss function of the soft calibration model to be executed by the calibration apparatus 100. Example operations of blocks 302, 304, 306, 308, 310, 312 and 314 of FIG. 3 may be used to implement block 202 of FIG. 2.

The example program 202 of FIG. 3 begins when the example criteria-based input determiner 102 of FIG. 1 determines criteria associated with panelist and/or reporting data (block 302). For example, the criteria-based input determiner 102 of FIG. 1 may determine and/or identify criteria associated the example panelist and/or reporting data 116 of FIG. 1 by accessing and/or obtaining the criteria from the example memory 114 of FIG. 1, and/or by receiving the criteria from the example user interface 112 of FIG. 1. In some examples, the criteria determined and/or identified by the criteria-based input determiner 102 of FIG. 1 may be expressed in a manner consistent with Equation 1 described above. Following block 302, control of the example program 202 of FIG. 3 proceeds to block 304.

At block 304, the example criteria-based input determiner 102 of FIG. 1 determines criteria variables for the criteria (block 304). For example, the criteria-based input determiner 102 of FIG. 1 may determine and/or identify criteria variables for the criteria by accessing and/or obtaining the criteria variables from the example memory 114 of FIG. 1, and/or by receiving the criteria variables from the example user interface 112 of FIG. 1. In some examples, the criteria variables determined and/or identified by the criteria-based input determiner 102 of FIG. 1 may be expressed in a manner consistent with Equation 2 described above. Following block 304, control of the example program 202 of FIG. 3 proceeds to block 306.

At block 306, the example criteria-based input determiner 102 of FIG. 1 determines targets for the criteria variables (block 306). For example, the criteria-based input determiner 102 of FIG. 1 may determine and/or identify targets for the criteria variables by accessing and/or obtaining the targets from the example memory 114 of FIG. 1, and/or by receiving the targets from the example user interface 112 of FIG. 1. In some examples, the targets determined and/or identified by the criteria-based input determiner 102 of FIG. 1 may be expressed in a manner consistent with Equation 3 described above. Following block 306, control of the example program 202 of FIG. 3 proceeds to block 308.

At block 308, the example criteria-based input determiner 102 of FIG. 1 determines lower bounds for the criteria variables (block 308). For example, the criteria-based input determiner 102 of FIG. 1 may determine and/or identify lower bounds for the criteria variables by accessing and/or obtaining the lower bounds from the example memory 114 of FIG. 1, and/or by receiving the lower bounds from the example user interface 112 of FIG. 1. In some examples, the lower bounds determined and/or identified by the criteria-based input determiner 102 of FIG. 1 may be expressed in a manner consistent with Equation 4 described above. Following block 308, control of the example program 202 of FIG. 3 proceeds to block 310.

At block 310, the example criteria-based input determiner 102 of FIG. 1 determines upper bounds for the criteria variables (block 310). For example, the criteria-based input determiner 102 of FIG. 1 may determine and/or identify upper bounds for the criteria variables by accessing and/or obtaining the upper bounds from the example memory 114 of FIG. 1, and/or by receiving the upper bounds from the example user interface 112 of FIG. 1. In some examples, the upper bounds determined and/or identified by the criteria-based input determiner 102 of FIG. 1 may be expressed in a manner consistent with Equation 4 described above. Following block 310, control of the example program 202 of FIG. 3 proceeds to block 312.

At block 312, the example criteria-based input determiner 102 of FIG. 1 determines scaling parameters for the criteria variables (block 312). For example, the criteria-based input determiner 102 of FIG. 1 may determine and/or identify scaling parameters for the criteria variables by accessing and/or obtaining the scaling parameters from the example memory 114 of FIG. 1, and/or by receiving the scaling parameters from the example user interface 112 of FIG. 1. In some examples, the scaling parameters determined and/or identified by the criteria-based input determiner 102 of FIG. 1 may be expressed in a manner consistent with Equation 5 described above. Following block 312, control of the example program 202 of FIG. 3 proceeds to block 314.

At block 314, the example criteria-based input determiner 102 of FIG. 1 determines importance parameters for the criteria variables (block 314). For example, the criteria-based input determiner 102 of FIG. 1 may determine and/or identify importance parameters for the criteria variables by accessing and/or obtaining the importance parameters from the example memory 114 of FIG. 1, and/or by receiving the importance parameters from the example user interface 112 of FIG. 1. In some examples, the importance parameters determined and/or identified by the criteria-based input determiner 102 of FIG. 1 may be expressed in a manner consistent with Equation 6 described above. Following block 314, the example program 202 of FIG. 3 ends and control returns to a calling function or process such as the example program 200 of FIG. 2.

Figure 4:
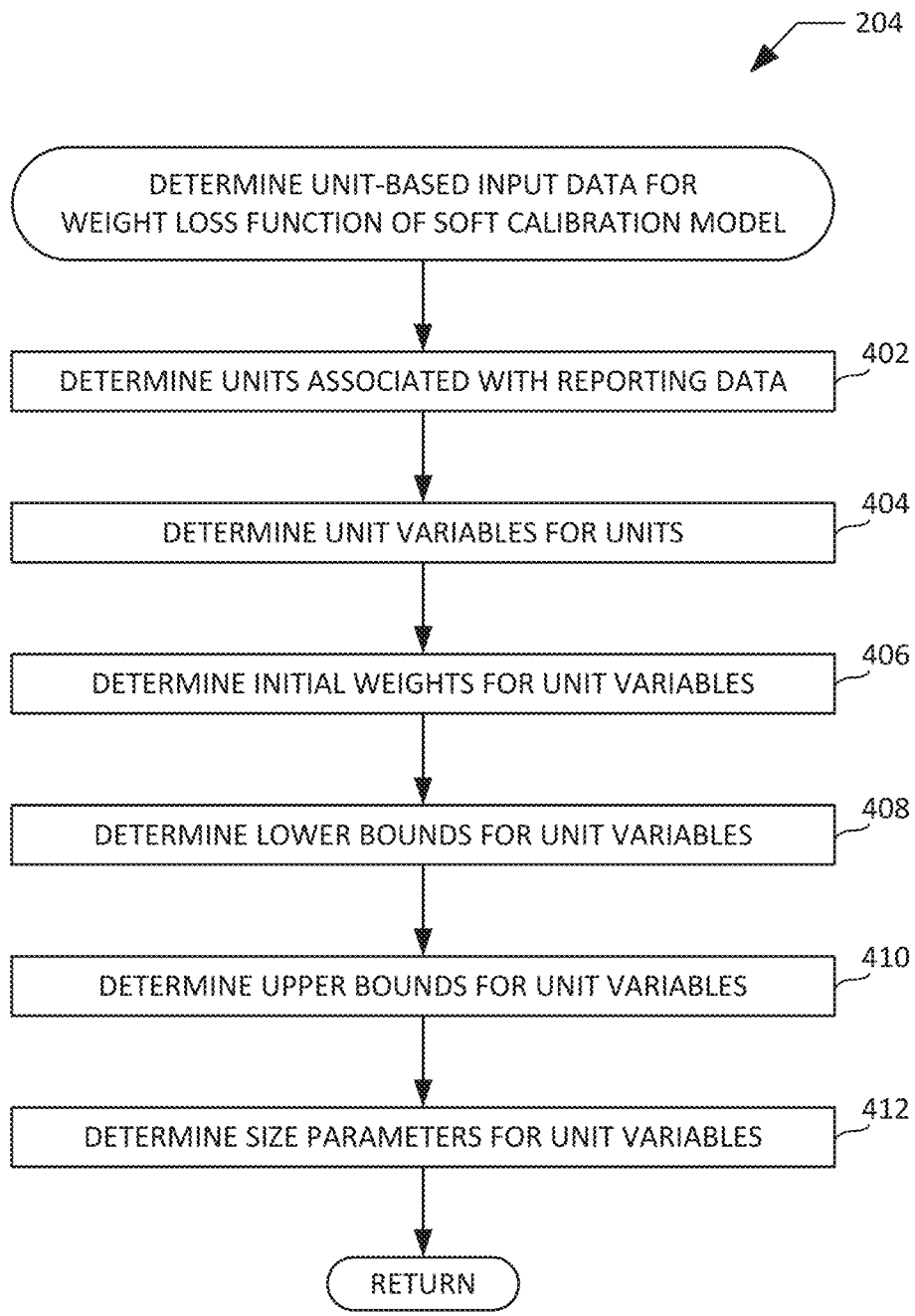
FIG. 4 is a flowchart representative of example machine readable instructions that may be executed at the example calibration apparatus of FIG. 1 to determine unit-based input data for the weight loss function of the soft calibration model to be executed by the calibration apparatus.

FIG. 4 is a flowchart representative of example machine readable instructions 204 that may be executed at the example calibration apparatus 100 of FIG. 1 to determine unit-based input data for the weight loss function of the soft calibration model to be executed by the calibration apparatus 100. Example operations of blocks 402, 404, 406, 408, 410 and 412 of FIG. 4 may be used to implement block 204 of FIG. 2.

The example program 204 of FIG. 4 begins when the example unit-based input determiner 104 of FIG. 1 determines units associated with panelist and/or reporting data (block 402). For example, the unit-based input determiner 104 of FIG. 1 may determine and/or identify units associated the example panelist and/or reporting data 116 of FIG. 1 by accessing and/or obtaining the units from the example memory 114 of FIG. 1, and/or by receiving the units from the example user interface 112 of FIG. 1. In some examples, the units determined and/or identified by the unit-based input determiner 104 of FIG. 1 may be expressed in a manner consistent with Equation 8 described above. Following block 402, control of the example program 204 of FIG. 4 proceeds to block 404.

At block 404, the example unit-based input determiner 104 of FIG. 1 determines unit variables for the units (block 404). For example, the unit-based input determiner 104 of FIG. 1 may determine and/or identify unit variables for the units by accessing and/or obtaining the unit variables from the example memory 114 of FIG. 1, and/or by receiving the unit variables from the example user interface 112 of FIG. 1. In some examples, the unit variables determined and/or identified by the unit-based input determiner 104 of FIG. 1 may be expressed in a manner consistent with Equation 9 described above. Following block 404, control of the example program 204 of FIG. 4 proceeds to block 406.

At block 406, the example unit-based input determiner 104 of FIG. 1 determines initial weights for the unit variables (block 406). For example, the unit-based input determiner 104 of FIG. 1 may determine and/or identify initial weights for the unit variables by accessing and/or obtaining the initial weights from the example memory 114 of FIG. 1, and/or by receiving the initial weights from the example user interface 112 of FIG. 1. In some examples, the initial weights determined and/or identified by the unit-based input determiner 104 of FIG. 1 may be expressed in a manner consistent with Equation 10 described above. Following block 406, control of the example program 204 of FIG. 4 proceeds to block 408.

At block 408, the example unit-based input determiner 104 of FIG. 1 determines lower bounds for the unit variables (block 408). For example, the unit-based input determiner 104 of FIG. 1 may determine and/or identify lower bounds for the unit variables by accessing and/or obtaining the lower bounds from the example memory 114 of FIG. 1, and/or by receiving the lower bounds from the example user interface 112 of FIG. 1. In some examples, the lower bounds determined and/or identified by the unit-based input determiner 104 of FIG. 1 may be expressed in a manner consistent with Equation 11 described above. Following block 408, control of the example program 204 of FIG. 4 proceeds to block 410.

At block 410, the example unit-based input determiner 104 of FIG. 1 determines upper bounds for the unit variables (block 410). For example, the unit-based input determiner 104 of FIG. 1 may determine and/or identify upper bounds for the unit variables by accessing and/or obtaining the upper bounds from the example memory 114 of FIG. 1, and/or by receiving the upper bounds from the example user interface 112 of FIG. 1. In some examples, the upper bounds determined and/or identified by the unit-based input determiner 104 of FIG. 1 may be expressed in a manner consistent with Equation 11 described above. Following block 410, control of the example program 204 of FIG. 4 proceeds to block 412.

At block 412, the example unit-based input determiner 104 of FIG. 1 determines size parameters for the unit variables (block 412). For example, the unit-based input determiner 104 of FIG. 1 may determine and/or identify size parameters for the unit variables by accessing and/or obtaining the size parameters from the example memory 114 of FIG. 1, and/or by receiving the size parameters from the example user interface 112 of FIG. 1. In some examples, the size parameters determined and/or identified by the unit-based input determiner 104 of FIG. 1 may be expressed in a manner consistent with Equation 12 described above. Following block 412, the example program 204 of FIG. 4 ends and control returns to a calling function or process such as the example program 200 of FIG. 2.

Figure 5:
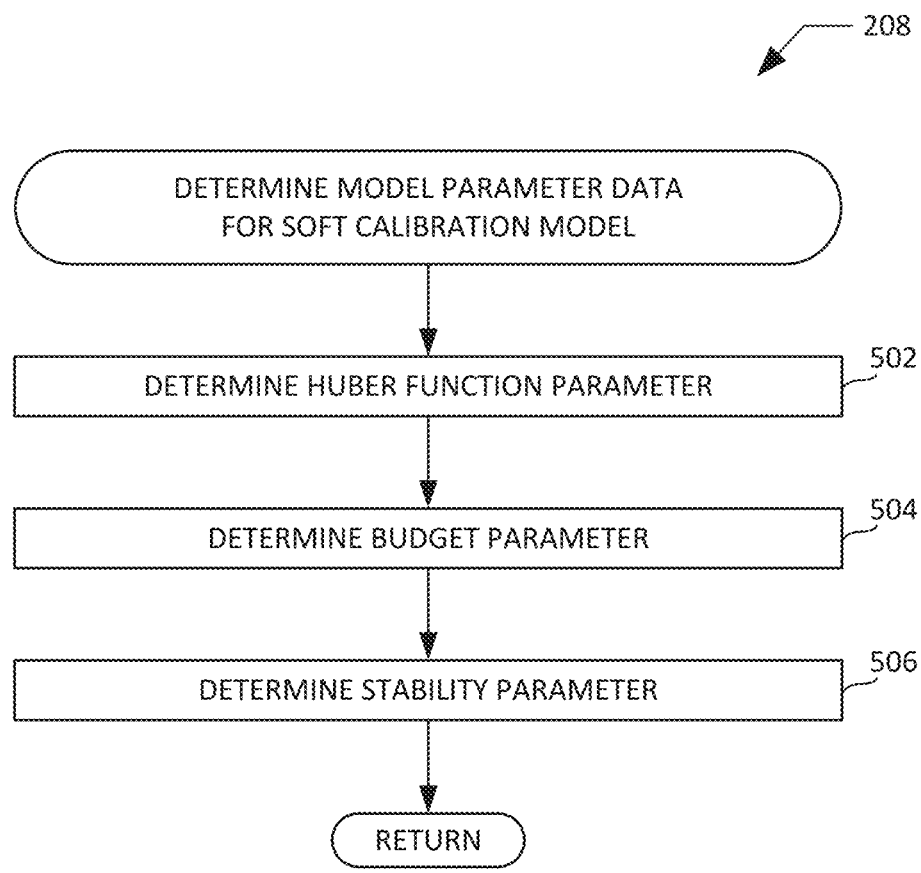
FIG. 5 is a flowchart representative of example machine readable instructions that may be executed at the example calibration apparatus of FIG. 1 to determine model parameter data for the soft calibration model to be executed by the calibration apparatus.

FIG. 5 is a flowchart representative of example machine readable instructions 208 that may be executed at the example calibration apparatus 100 of FIG. 1 to determine model parameters for the soft calibration model to be executed by the calibration apparatus 100. Example operations of blocks 502, 504 and 506 of FIG. 5 may be used to implement block 208 of FIG. 2.

The example program 208 of FIG. 5 begins when the example model parameter determiner 108 of FIG. 1 determines a Huber function parameter for the soft calibration model (block 502). For example, the model parameter determiner 108 of FIG. 1 may determine and/or identify a Huber function parameter for the soft calibration model by accessing and/or obtaining the Huber function parameter from the example memory 114 of FIG. 1, and/or by receiving the Huber function parameter from the example user interface 112 of FIG. 1. Following block 502, control of the example program 208 of FIG. 5 proceeds to block 504.

At block 504, the example model parameter determiner 108 of FIG. 1 determines a budget parameter for the soft calibration model (block 504). For example, the model parameter determiner 108 of FIG. 1 may determine and/or identify a budget parameter for the soft calibration model by accessing and/or obtaining the budget parameter from the example memory 114 of FIG. 1, and/or by receiving the budget parameter from the example user interface 112 of FIG. 1. Following block 504, control of the example program 208 of FIG. 5 proceeds to block 506.

At block 506, the example model parameter determiner 108 of FIG. 1 determines a stability parameter for the soft calibration model (block 506). For example, the model parameter determiner 108 of FIG. 1 may determine and/or identify a stability parameter for the soft calibration model by accessing and/or obtaining the stability parameter from the example memory 114 of FIG. 1, and/or by receiving the stability parameter from the example user interface 112 of FIG. 1. Following block 506, the example program 208 of FIG. 5 ends and control returns to a calling function or process such as the example program 200 of FIG. 2.

Figure 6:
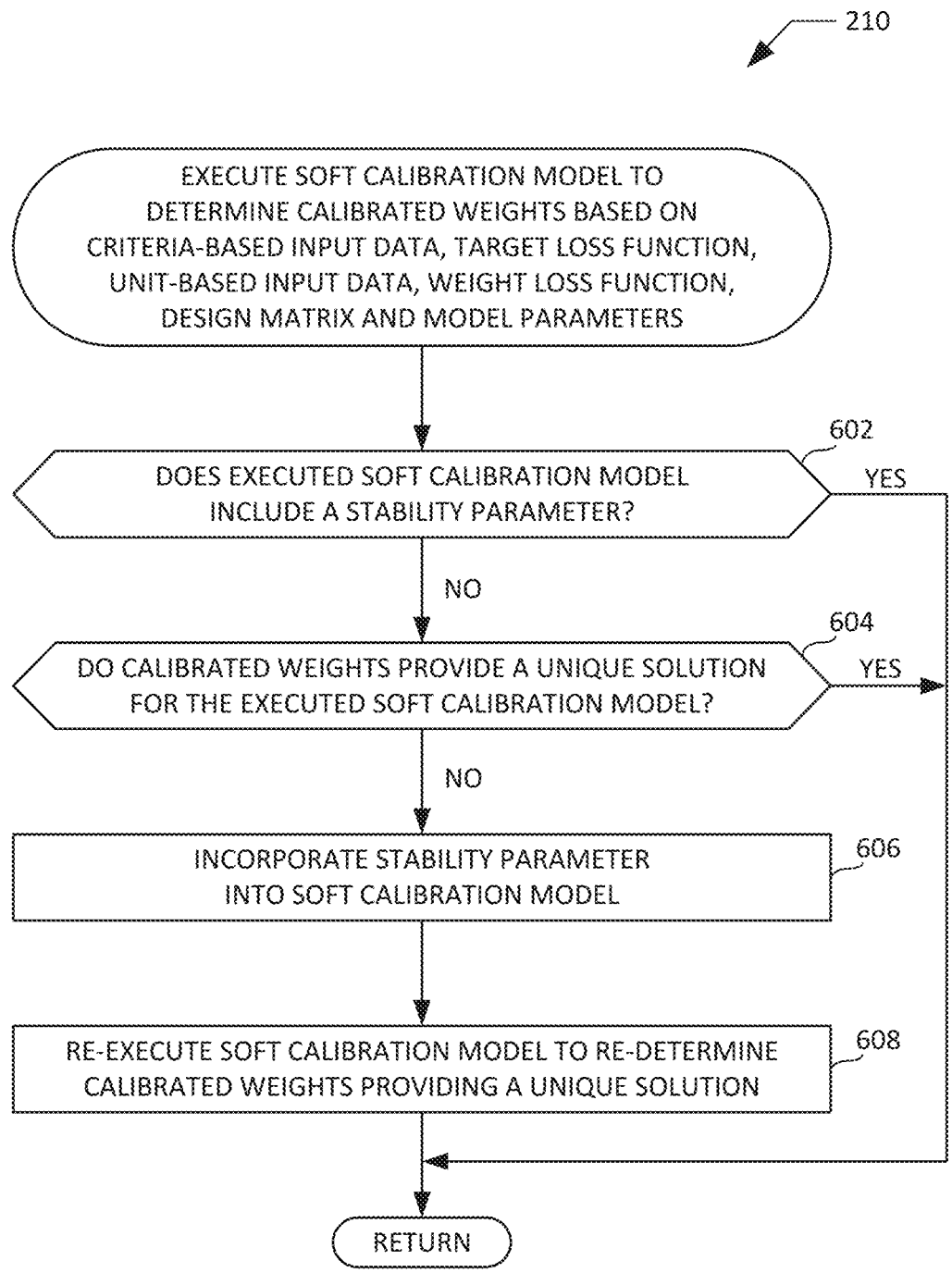
FIG. 6 is a flowchart representative of example machine readable instructions that may be executed at the example calibration apparatus of FIG. 1 to validate the soft calibration model executed by the calibration apparatus.

FIG. 6 is a flowchart representative of example machine readable instructions 210 that may be executed at the example calibration apparatus 100 of FIG. 1 to validate the soft calibration model executed by the calibration apparatus. Example operations of blocks 602, 604, 606, 608, 610, 612, 614 and 616 of FIG. 6 may be used to implement block 210 of FIG. 2 in instances when the model parameter data 128 incorporated into the soft calibration model may lack a stability parameter.

The example program 210 of FIG. 6 begins when the example calibration model validator 138 of FIG. 1 determines whether the soft calibration model executed by the example calibration engine 110 of FIG. 1 includes a stability parameter (block 602). For example, the calibration model validator 138 of FIG. 1 may determine that a soft calibration model expressed in a manner consistent with Equation 17 described above does not include a stability parameter. If the calibration model validator 138 determines at block 602 that the soft calibration model executed by the calibration engine 110 of FIG. 1 does not include a stability parameter, control of the example program 210 of FIG. 6 proceeds to block 604. If the calibration model validator 138 instead determines at block 602 that the soft calibration model executed by the calibration engine 110 of FIG. 1 does include a stability parameter, the example program 210 of FIG. 6 ends and control returns to a calling function or process such as the example program 200 of FIG. 2.

At block 604, the example calibration model validator 138 of FIG. 1 determines whether the calibrated weights resulting from the soft calibration model being executed by the example calibration engine 110 of FIG. 1 provide a unique solution for the executed soft calibration model (block 604). If the calibration model validator 138 determines at block 604 that the calibrated weights resulting from the soft calibration model being executed by the example calibration engine 110 of FIG. 1 do not provide a unique solution for the executed soft calibration model, control of the example program 210 of FIG. 6 proceeds to block 606. If the calibration model validator 138 instead determines at block 604 that the calibrated weights resulting from the soft calibration model being executed by the example calibration engine 110 of FIG. 1 do provide a unique solution for the executed soft calibration model, the example program 210 of FIG. 6 ends and control returns to a calling function or process such as the example program 200 of FIG. 2.

At block 606, the example calibration model validator 138 of FIG. 1 incorporates a stability parameter into the soft calibration model (block 606). For example, the calibration model validator 138 of FIG. 1 may incorporate a stability parameter expressed in a manner consistent with Equation 16 described above into the soft calibration model expressed in a manner consistent with Equation 17 described above to provide the soft calibration model expressed in a manner consistent with Equation 18 described above (e.g., a soft calibration model including a stability parameter). Following block 606, control of the example program 210 of FIG. 6 proceeds to block 608.

At block 608, the example calibration engine 110 of FIG. 1 re-executes the soft calibration model to re-determine the calibrated weights (block 608). For example, the calibration engine 110 of FIG. 1 may re-execute the soft calibration model based on the example criteria-based input data 118, the example target loss function 120, the example unit-based input data 122, the example weight loss function 124, the example matrix data 126, and the example model parameter data 128 of FIG. 1, including the stability parameter. In response to the calibration engine 110 of FIG. 1 executing the soft calibration model, the calibrated weights determiner 130 of FIG. 1 determines the example calibrated weights data 132 of FIG. 1 based on the criteria-based input data 118, the target loss function 120, the unit-based input data 122, the weight loss function 124, the matrix data 126, and the model parameter data 128 incorporated into the executed soft calibration model, including the stability parameter. The calibrated weights determined (e.g., re-determined) at block 608 provide a unique solution for the re-executed soft calibration model. Following block 608, the example program 210 of FIG. 6 ends and control returns to a calling function or process such as the example program 200 of FIG. 2.

Figure 7:
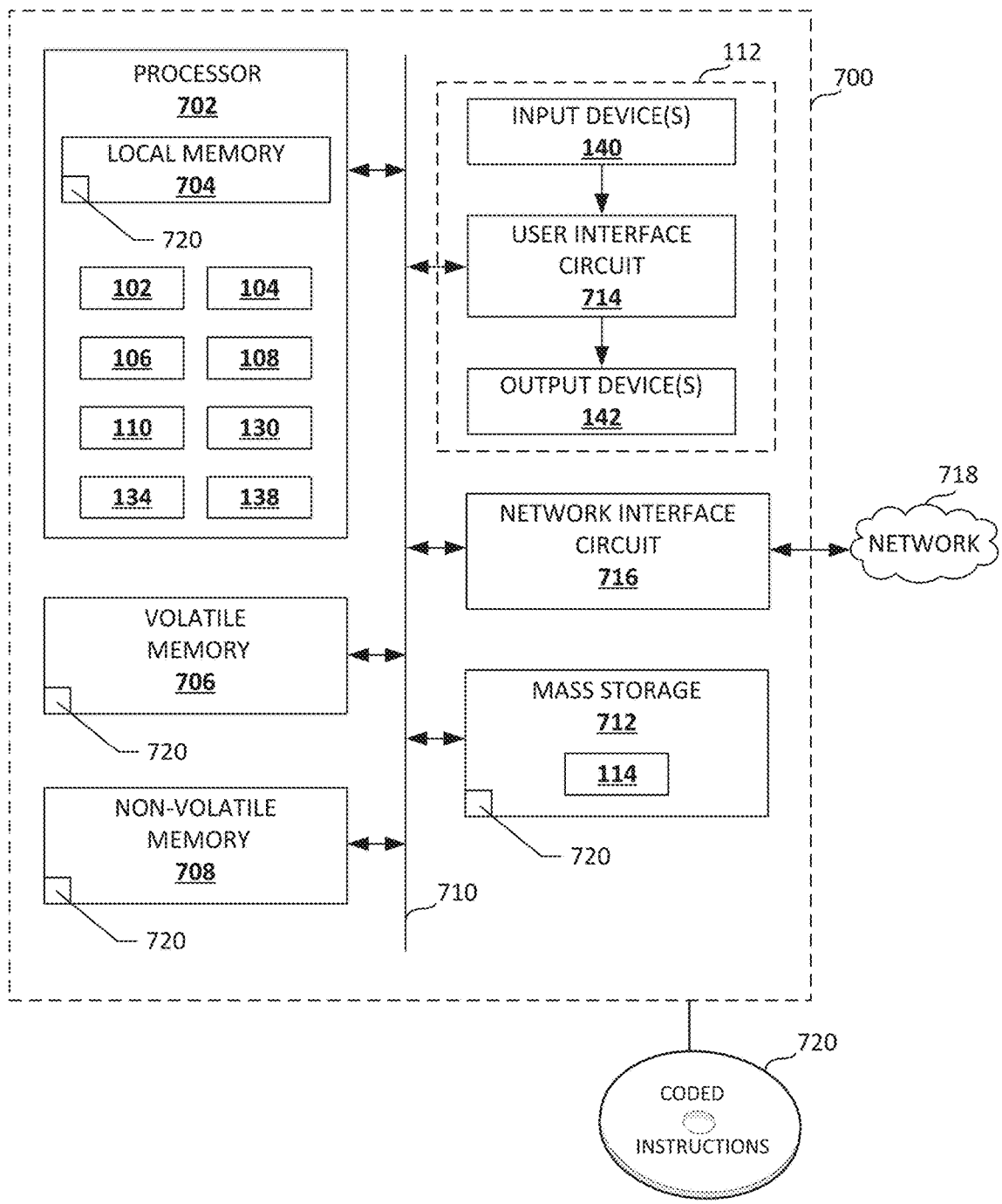
FIG. 7 is an example processor platform capable of executing the instructions of FIGS. 2-6 to implement the example calibration apparatus of FIG. 1.

FIG. 7 is an example processor platform 700 capable of executing the instructions of FIGS. 2-6 to implement the example calibration apparatus 100 of FIG. 1. The processor platform 700 of the illustrated example includes a processor 702. The processor 702 of the illustrated example is hardware. For example, the processor 702 can be implemented by one or more integrated circuit(s), logic circuit(s), controller(s), microcontroller(s) and/or microprocessor(s) from any desired family or manufacturer. The processor 702 of the illustrated example includes a local memory 704 (e.g., a cache). The processor 702 of the illustrated example also includes the example criteria-based input determiner 102, the example unit-based input determiner 104, the example matrix determiner 106, the example model parameter determiner 108, the example calibration engine 110, the example calibrated weights determiner 130, the example calibrated reporting data determiner 134, and the example calibration model validator 138 of FIG. 1.

The processor 702 of the illustrated example is also in communication with a main memory including a volatile memory 706 and a non-volatile memory 708 via a bus 710. The volatile memory 706 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 708 may be implemented by flash memory and/or any other desired type of memory device. Access to the volatile memory 706 and the non-volatile memory 708 is controlled by a memory controller.

The processor 702 of the illustrated example is also in communication with one or more mass storage device(s) 712 for storing software and/or data. Examples of such mass storage devices 712 include floppy disk drives, hard disk drives, compact disk drives, Blu-ray disk drives, RAID systems, and digital versatile disk (DVD) drives. In the illustrated example of FIG. 7, the mass storage device 712 includes the example memory 114 of FIG. 1.

The processor platform 700 of the illustrated example also includes a user interface circuit 714. The user interface circuit 714 may be implemented by any type of interface standard, such as an Ethernet interface, a universal serial bus (USB), and/or a PCI express interface. In the illustrated example, one or more input device(s) 140 are connected to the user interface circuit 714. The input device(s) 140 permit(s) a user to enter data and commands into the processor 702. The input device(s) 140 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 142 are also connected to the user interface circuit 714 of the illustrated example. The output device(s) 142 can be implemented, for example, by a light emitting diode, an organic light emitting diode, a liquid crystal display, a touchscreen and/or a speaker. The user interface circuit 714 of the illustrated example may, thus, include a graphics driver such as a graphics driver chip and/or processor. In the illustrated example, the input device(s) 140, the output device(s) 142 and the user interface circuit 714 collectively form the example user interface 112 of FIG. 1.

The processor platform 700 of the illustrated example also includes a network interface circuit 716. The network interface circuit 716 may be implemented by any type of interface standard, such as an Ethernet interface, a universal serial bus (USB), and/or a PCI express interface. In the illustrated example, the network interface circuit 716 facilitates the exchange of data and/or signals with external machines (e.g., a remote server) via a network 718 (e.g., a local area network (LAN), a wireless local area network (WLAN), a wide area network (WAN), the Internet, a cellular network, etc.).

Coded instructions 720 corresponding to FIGS. 2-6 may be stored in the local memory 704, in the volatile memory 706, in the non-volatile memory 708, in the mass storage device 712, and/or on a removable tangible computer readable storage medium such as a flash memory stick, a CD or DVD.

From the foregoing, it will be appreciated that methods, systems and apparatus have been disclosed for calibrating data (e.g., panelist and/or reporting data) using relaxed benchmark constraints. Unlike hard calibration models and/or techniques requiring that estimated totals associated with projection weights match reference and/or benchmark totals precisely, the disclosed soft calibration models and/or techniques advantageously generate adjusted and/or modified projection weights such that the distance and/or deviation between the estimated totals and the reference and/or benchmark totals is smaller than some particular value (e.g., a threshold and/or budget). By relaxing the benchmark constraints associated with traditional hard calibration models and/or techniques, the disclosed soft calibration models and/or techniques advantageously reduce (e.g., eliminate) the above-described errors that may arise in connection with the use of hard calibration models and/or techniques when the calibration weights take on a relatively large magnitude. Thus, a data measurement company implementing the disclosed soft calibration models and/or techniques in lieu of traditional hard calibration models and/or techniques may advantageously provide and/or generate calibrated panelist and/or reporting data that more closely matches and/or resembles reference and/or benchmark data.

Apparatus for generating a unique solution when calibrating data via a calibration model having relaxed benchmark constraints are disclosed. In some disclosed examples, the apparatus comprises a calibration engine to execute the calibration model based on a target loss function, a weight loss function, and a budget parameter. In some disclosed examples, the apparatus further comprises a calibrated weights determiner to determine calibrated weights resulting from execution of the calibration model. In some disclosed examples, the apparatus further comprises a calibration model validator to incorporate a stability parameter into the calibration model in response to determining that the calibrated weights do not provide a unique solution for the executed calibration model. In some disclosed examples, the stability parameter is to reduce an influence of the budget parameter on the calibration model to enable the generation of a unique solution.

In some disclosed examples, the calibration engine is to re-execute the calibration model based on the target loss function, the weight loss function, the budget parameter, and the stability parameter. In some disclosed examples, the calibrated weights determiner is to re-determine the calibrated weights resulting from re-execution of the calibration model. In some disclosed examples, the re-determined calibrated weights are to provide a unique solution for the re-executed calibration model.

In some disclosed examples, the calibration engine is to execute the calibration model based further on criteria-based input data to be incorporated into the target loss function and unit-based input data to be incorporated into the weight loss function. In some disclosed examples, the criteria-based input data includes criteria variables, targets for the criteria variables, upper and lower bounds for the criteria variables, scaling parameters for the criteria variables, and importance parameters for the criteria variables. In some disclosed examples, the unit-based input data includes unit variables, initial weights for the unit variables, upper and lower bounds for the unit variables, and size parameters for the unit variable. In some disclosed examples, the calibration engine is to execute the calibration model based further on matrix data. In some disclosed examples, the matrix data is based on the criteria-based input data and the unit-based input data.

Methods for generating a unique solution when calibrating data via a calibration model having relaxed benchmark constraints are disclosed. In some disclosed examples, the method comprises executing the calibration model based on a target loss function, a weight loss function, and a budget parameter. In some disclosed examples, the method further comprises determining, by executing one or more computer readable instructions with a processor, calibrated weights resulting from the executing of the calibration model. In some disclosed examples, the method further comprises incorporating, by executing one or more computer readable instructions with the processor, a stability parameter into the calibration model in response to determining that the calibrated weights do not provide a unique solution for the executed calibration model. In some disclosed examples, the stability parameter is to reduce an influence of the budget parameter on the calibration model to enable the generation of a unique solution.

In some disclosed examples, the method further includes re-executing the calibration model based on the target loss function, the weight loss function, the budget parameter, and the stability parameter. In some disclosed examples, the method further includes re-determining the calibrated weights resulting from the re-executing of the calibration model. In some disclosed examples, the re-determined calibrated weights are to provide a unique solution for the re-executed calibration model.

In some disclosed examples, the executing of the calibration model is further based on criteria-based input data incorporated into the target loss function and unit-based input data incorporated into the weight loss function. In some disclosed examples, the criteria-based input data includes criteria variables, targets for the criteria variables, upper and lower bounds for the criteria variables, scaling parameters for the criteria variables, and importance parameters for the criteria variables. In some disclosed examples, the unit-based input data includes unit variables, initial weights for the unit variables, upper and lower bounds for the unit variables, and size parameters for the unit variables. In some disclosed examples, the executing of the calibration model is further based on matrix data. In some disclosed examples, the matrix data is based on the criteria-based input data and the unit-based input data.

Tangible machine-readable storage media comprising instructions are also disclosed. In some disclosed examples, the instructions, when executed, cause a processor to execute a calibration model based on a target loss function, a weight loss function, and a budget parameter. In some disclosed examples, the calibration model has relaxed benchmark constraints. In some disclosed examples, the instructions, when executed, cause the processor to determine calibrated weights resulting from the execution of the calibration model. In some disclosed examples, the instructions, when executed, cause the processor to incorporate a stability parameter into the calibration model in response to determining that the calibrated weights do not provide a unique solution for the executed calibration model. In some disclosed examples, the stability parameter is to reduce an influence of the budget parameter on the calibration model to enable the generation of a unique solution.

In some disclosed examples, the instructions, when executed, are further to cause the processor to re-execute the calibration model based on the target loss function, the weight loss function, the budget parameter, and the stability parameter. In some disclosed examples, the instructions, when executed, are further to cause the processor to re-determine the calibrated weights resulting from the re-execution of the calibration model. In some disclosed examples, the re-determined calibrated weights are to provide a unique solution for the re-executed calibration model.

In some disclosed examples, the instructions, when executed, are to cause the processor to execute the calibration model based further on criteria-based input data incorporated into the target loss function and unit-based input data incorporated into the weight loss function. In some disclosed examples, the criteria-based input data includes criteria variables, targets for the criteria variables, upper and lower bounds for the criteria variables, scaling parameters for the criteria variables, and importance parameters for the criteria variables. In some disclosed examples, the unit-based input data includes unit variables, initial weights for the unit variables, upper and lower bounds for the unit variables, and size parameters for the unit variables. In some disclosed examples, the instructions, when executed, are to cause the processor to execute the calibration model based further on matrix data. In some disclosed examples, the matrix data is based on the criteria-based input data and the unit-based input data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for generating a unique solution when calibrating data via a calibration model having relaxed benchmark constraints, the apparatus comprising:
   a calibration engine to execute the calibration model based on a target loss function, a weight loss function, and a budget parameter, the budget parameter being an upper constraint that a weight loss value determined via the weight loss function is allowed to obtain;
   a calibrated weights determiner to determine calibrated weights resulting from execution of the calibration model; and
   a calibration model validator to incorporate a stability parameter into the calibration model in response to determining that the calibrated weights do not provide a unique solution for the executed calibration model, the stability parameter to reduce an influence of the budget parameter on the calibration model to enable the generation of a unique solution.

2. The apparatus as defined in claim 1, wherein the calibration engine is to re-execute the calibration model based on the target loss function, the weight loss function, the budget parameter, and the stability parameter, and the calibrated weights determiner is to re-determine the calibrated weights resulting from re-execution of the calibration model.

3. The apparatus as defined in claim 2, wherein the re-determined calibrated weights are to provide a unique solution for the re-executed calibration model.

4. The apparatus as defined in claim 1, wherein the calibration engine is to execute the calibration model based further on criteria-based input data to be incorporated into the target loss function and unit-based input data to be incorporated into the weight loss function.

5. The apparatus as defined in claim 4, wherein the criteria-based input data includes criteria variables and at least one of targets for the criteria variables, upper and lower bounds for the criteria variables, scaling parameters for the criteria variables, or importance parameters for the criteria variables.

6. The apparatus as defined in claim 4, wherein the unit-based input data includes unit variables and at least one of initial weights for the unit variables, upper and lower bounds for the unit variables, or size parameters for the unit variables.

7. The apparatus as defined in claim 4, wherein the calibration engine is to execute the calibration model based further on matrix data, the matrix data being based on the criteria-based input data and the unit-based input data.

8. A method for generating a unique solution when calibrating data via a calibration model having relaxed benchmark constraints, the method comprising:
   executing the calibration model based on a target loss function, a weight loss function, and a budget parameter, the budget parameter being an upper constraint that a weight loss value determined via the weight loss function is allowed to obtain;
   determining, by executing one or more computer readable instructions with a processor, calibrated weights resulting from the executing of the calibration model; and
   incorporating, by executing one or more computer readable instructions with the processor, a stability parameter into the calibration model in response to determining that the calibrated weights do not provide a unique solution for the executed calibration model, the stability parameter to reduce an influence of the budget parameter on the calibration model to enable the generation of a unique solution.

9. The method as defined in claim 8, further including:
   re-executing the calibration model based on the target loss function, the weight loss function, the budget parameter, and the stability parameter; and
   re-determining the calibrated weights resulting from the re-executing of the calibration model.

10. The method as defined in claim 9, wherein the re-determined calibrated weights are to provide a unique solution for the re-executed calibration model.

11. The method as defined in claim 8, wherein the executing of the calibration model is further based on criteria-based input data incorporated into the target loss function and unit-based input data incorporated into the weight loss function.

12. The method as defined in claim 11, wherein the criteria-based input data includes criteria variables and at least one of targets for the criteria variables, upper and lower bounds for the criteria variables, scaling parameters for the criteria variables, or importance parameters for the criteria variables.

13. The method as defined in claim 11, wherein the unit-based input data includes unit variables and at least one of initial weights for the unit variables, upper and lower bounds for the unit variables, or size parameters for the unit variables.

14. The method as defined in claim 11, wherein the executing of the calibration model is further based on matrix data, the matrix data being based on the criteria-based input data and the unit-based input data.

15. A tangible machine-readable storage medium comprising instructions that, when executed, cause a processor to at least:
 execute a calibration model based on a target loss function, a weight loss function, and a budget parameter, the calibration model having relaxed benchmark constraints, the budget parameter being an upper constraint that a weight loss value determined via the weight loss function is allowed to obtain;
 determine calibrated weights resulting from the execution of the calibration model; and
 incorporate a stability parameter into the calibration model in response to determining that the calibrated weights do not provide a unique solution for the executed calibration model, the stability parameter to reduce an influence of the budget parameter on the calibration model to enable the generation of a unique solution.

16. The tangible machine-readable storage medium as defined in claim 15, wherein the instructions, when executed, are further to cause the processor to:
 re-execute the calibration model based on the target loss function, the weight loss function, the budget parameter, and the stability parameter; and
 re-determine the calibrated weights resulting from the re-execution of the calibration model.

17. The tangible machine-readable storage medium as defined in claim 16, wherein the re-determined calibrated weights are to provide a unique solution for the re-executed calibration model.

18. The tangible machine-readable storage medium as defined in claim 15, wherein the instructions, when executed, are to cause the processor to execute the calibration model based further on criteria-based input data incorporated into the target loss function and unit-based input data incorporated into the weight loss function.

19. The tangible machine-readable storage medium as defined in claim 18, wherein the criteria-based input data includes criteria variables and at least one of targets for the criteria variables, upper and lower bounds for the criteria variables, scaling parameters for the criteria variables, or importance parameters for the criteria variables.

20. The tangible machine-readable storage medium as defined in claim 18, wherein the unit-based input data includes unit variables and at least one of initial weights for the unit variables, upper and lower bounds for the unit variables, or size parameters for the unit variables.

21. The apparatus as defined in claim 1, wherein the target loss function has a flat region, the stability parameter to prevent a minimization procedure of the calibration model from reaching the flat region.

* * * * *